US012375900B2

(12) United States Patent
Chaugule et al.

(10) Patent No.: US 12,375,900 B2
(45) Date of Patent: Jul. 29, 2025

(54) SECONDARY eSIM PROVISIONING FOR WIRELESS DEVICES

(71) Applicant: Apple Inc., Cupertino, CA (US)

(72) Inventors: Raj S. Chaugule, Santa Clara, CA (US); Francisco J. Gonzalez, San Diego, CA (US); Jianwei Chen, Fremont, CA (US); John Basacchi, San Diego, CA (US); Li Li, Los Altos, CA (US); Nai Tao Cui, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 416 days.

(21) Appl. No.: 18/052,090

(22) Filed: Nov. 2, 2022

(65) Prior Publication Data
US 2024/0147219 A1 May 2, 2024

(51) Int. Cl.
*H04W 8/20* (2009.01)
*H04W 12/069* (2021.01)
*H04W 60/04* (2009.01)
*H04W 88/06* (2009.01)

(52) U.S. Cl.
CPC ........... *H04W 8/205* (2013.01); *H04W 60/04* (2013.01); *H04W 12/069* (2021.01); *H04W 88/06* (2013.01)

(58) Field of Classification Search
CPC ... H04W 8/205; H04W 60/04; H04W 12/069; H04W 88/06; H04W 12/06; H04W 12/35
See application file for complete search history.

(56) References Cited

U.S. PATENT DOCUMENTS

| 2015/0098412 | A1* | 4/2015 | Yerramalli | H04W 74/0808 |
| | | | | 370/329 |
| 2018/0184331 | A1* | 6/2018 | Samdanis | H04W 28/16 |
| 2019/0207935 | A1* | 7/2019 | Poovappa | H04L 63/123 |
| 2020/0245384 | A1* | 7/2020 | Jacobs | H04W 12/00 |
| 2022/0232366 | A1* | 7/2022 | Seo | H04W 8/18 |
| 2022/0232388 | A1* | 7/2022 | Seo | H04W 8/183 |
| 2023/0292127 | A1* | 9/2023 | Raghavan | H04W 12/08 |

* cited by examiner

*Primary Examiner* — Mazda Sabouri
(74) *Attorney, Agent, or Firm* — DICKINSON WRIGHT RLLP

(57) ABSTRACT

This application describes provisioning a secondary electronic subscriber identity module (eSIM) to a wireless device to access a cellular wireless network of a mobile virtual network operator (MVNO) to supplement and offload from a cellular wireless network of a mobile network operator (MNO) that provides cellular wireless services to users of the MVNO. Provisioning of the secondary eSIM can be triggered after i) boot up of the wireless device or ii) insertion of a primary SIM/eSIM that provides MVNO cellular service access via the MNO cellular wireless network. Provisioning can be anchored by an MVNO entitlement server or by a manufacturer device services server. Provisioning can also be triggered by the MNO cellular wireless network after attachment of the wireless device. Authentication and authorization of the wireless device to obtain the secondary eSIM can be based on the primary SIM/eSIM or on secure communication with the manufacturer device services server.

20 Claims, 15 Drawing Sheets

SECONDARY eSIM PROVISIONING FOR WIRELESS DEVICES

FIELD

The described embodiments set forth techniques for managing provisioning of a secondary electronic subscriber identity module (eSIM) to a wireless device for access to a limited deployment wireless network managed by a mobile virtual network operator (MVNO) to supplement and offload select services from a primary wireless network managed by a mobile network operator (MNO), which provides cellular wireless services to users of the MVNO.

BACKGROUND

Many wireless devices are configured to use removable Universal Integrated Circuit Cards (UICCs) that enable the wireless devices to access services provided by Mobile Network Operators (MNOs), which may also be referred to as carriers. Each UICC includes at least a microprocessor and a read-only memory (ROM), where the ROM is configured to store an MNO profile that the wireless device can use to register and interact with an MNO to obtain wireless services via a cellular wireless network. A profile may also be referred to as subscriber identity module (SIM). Typically, a UICC takes the form of a small removable card, commonly referred to as a SIM card, which is inserted into a UICC-receiving bay of a mobile wireless device. In more recent implementations, UICCs are being embedded directly into system boards of wireless devices as embedded UICCs (eUICCs), which can provide advantages over traditional, removable UICCs. The eUICCs can include a rewritable memory that can facilitate installation, modification, and/or deletion of one or more electronic SIMs (eSIMs) on the eUICC, where the eSIMs can provide for new and/or different services and/or updates for accessing extended features provided by MNOs. An eUICC can store a number of MNO profiles—also referred to herein as eSIMs—and can eliminate the need to include UICC-receiving bays in wireless devices.

In some cases, a Mobile Virtual Network Operator (MVNO) provides cellular services to a user via another MNO's cellular wireless network, such as when the MVNO does not have widespread national or regional coverage. The MVNO provides to a user's wireless device a UICC (SIM card) or eSIM designated for cellular services of the MVNO but providing credentials for wireless access via another MNO's cellular wireless network. The MVNO leases access from the MNO to provide cellular services to the user's wireless device. In parallel, the MVNO can deploy in limited geographic areas their own cellular wireless access network and prefer to offload select services provided to the user's wireless device to their own wireless network. A secondary eSIM, separate from the primary SIM/eSIM for the MVNO service via the MNO cellular wireless network, can be required for the wireless device to access to the MNVO deployed cellular wireless network. There exists a need to provision a secondary eSIM to a wireless device to supplement a primary SIM/eSIM to access services of an MVNO.

SUMMARY

The described embodiments set forth techniques for managing provisioning of a secondary electronic subscriber identity module (eSIM) to a wireless device for access to a limited deployment wireless network managed by a mobile virtual network operator (MVNO) to supplement and offload select services from a primary wireless network managed by a mobile network operator (MNO), which provides cellular wireless services to users of the MVNO. The MNVO, referred to as carrier B, uses the cellular radio network of the MNO, referred to as carrier A, to provide cellular wireless services to a user's wireless device. The MNVO has a business agreement with the MNO for access to the MNO cellular radio network. The MVNO deploys an MVNO-owed cellular wireless network in limited geographic areas to provide for offloading select services, such as data services, for the user's wireless device when operating within the limited geographic areas. Access to cellular wireless services of the MVNO via the MNO wireless network uses a primary SIM/eSIM, while access to cellular wireless services of the MVNO via the MVNO wireless network uses a secondary eSIM. In some embodiments, the primary SIM/eSIM and the secondary eSIM are associated with a common mobile station international subscriber directory number (MSISDN) value, also referred to as a phone number. The wireless device includes a first wireless protocol stack associated with the primary SIM/eSIM for managing cellular wireless communication for MVNO cellular wireless services via the MNO wireless network and a second wireless protocol stack associated with the secondary eSIM for managing cellular wireless communication for MVNO cellular wireless services via the MVNO wireless network. Select cellular wireless communication, such as packet data communication, can be offloaded from the MNO wireless network to the MVNO wireless network. In some embodiments, packet data communication is offloaded to the MVNO wireless network when available in a geographic region in which the user's wireless device is operating and when performance criteria for the MVNO wireless network are satisfied, e.g., a signal strength and/or signal quality for cellular wireless connections to the MVNO wireless network meet corresponding criteria alone or relative to cellular wireless connections to the MNO wireless network (if available).

In some embodiments, a wireless device, i) upon booting up and/or ii) after installation of a SIM or eSIM for access to MVNO cellular wireless services via an MNO cellular wireless network, initiates provisioning of a secondary eSIM for access to MVNO cellular wireless services via an MVNO cellular wireless network. In some embodiments, the secondary eSIM is designated for a particular subset of cellular wireless services, such as for packet data communication. In some embodiments, provisioning the secondary eSIM to the wireless device includes: i) obtaining information for the secondary eSIM, ii) binding the secondary eSIM to the primary SIM/eSIM, and iii) downloading and installing the secondary eSIM on an eUICC of the wireless device. In some embodiments, the wireless device is authenticated by an entitlement server of the MVNO cellular wireless network based on credentials of the primary SIM/eSIM. In some embodiments, authentication of the wireless device includes the eUICC of the wireless device providing a challenge response using the primary SIM/eSIM, where the challenge response is validated by an authentication system of the MNO cellular wireless network associated with the primary SIM/eSIM. In some embodiments, the entitlement server of the MVNO cellular wireless network provides a unique identifier, e.g., an international circuit card identifier (ICCID) value or a hashed version of the ICCID value, for the secondary eSIM to the wireless device with a network address for a network provisioning system managed by the MVNO from which to obtain the secondary eSIM.

In some embodiments, the wireless device attaches the MNO cellular wireless network, which provides a hardware identifier, e.g., international mobile equipment identifier (IMEI) value, of the wireless device to a provisioning system of the MVNO cellular wireless network. The provisioning system determines whether a secondary eSIM is installed on the eUICC of the wireless device. In some embodiments, the provisioning system obtains a unique identifier for the eUICC of the wireless device, e.g., an eUICC identifier (EID) value, from a query server managed by a manufacturer of the wireless device. The MVNO provisioning system can maintain a database of EID values with indications of whether a secondary eSIM is installed on eUICCs identified by the EID values. When i) the wireless device attached to the MNO cellular wireless network for access to MVNO cellular wireless services includes the primary SIM/eSIM and ii) the eUICC of the wireless device identified by the EID value does not include a secondary eSIM, the provisioning system of the MVNO cellular wireless network triggers provisioning of the secondary eSIM to the wireless device. In some embodiments, the provisioning system of the MVNO cellular wireless network sends an indication of availability of the secondary eSIM to a device services server maintained by the manufacturer of the wireless device, and the device services server triggers a notification message to be sent to the wireless device. In some embodiments, the notification message includes information for downloading and installing the secondary eSIM from the provisioning system of the MVNO cellular wireless network. In some embodiments, the notification message redirects the wireless device to a lookup server maintained by a manufacturer of the wireless device to obtain the information for downloading and installing the secondary eSIM.

In some embodiments, the wireless device provides a message to a device services server maintained by a manufacturer of the wireless device, the message including an indication that a primary SIM/eSIM for access to MVNO cellular wireless services via an MNO cellular wireless network is present in the wireless device. In some embodiments, the message sent to the device services server includes indications for all SIMs and/or eSIMs included in the wireless device. When the wireless device includes the primary SIM/eSIM but does not include a secondary eSIM, the device services server obtains an authentication token from a provisioning system of an MVNO cellular wireless network and provides the authentication token to the wireless device. The wireless device provides the authentication token to an entitlement server of the MVNO cellular wireless network to initiate provisioning of the secondary eSIM to the wireless device. The provisioning system of the MVNO cellular wireless network provides a unique identifier of the secondary eSIM to the wireless device and an indication of availability of the secondary eSIM to the device services server of the device manufacturer, which triggers a notification message to be sent to the wireless device. In some embodiments, the notification message includes information for downloading and installing the secondary eSIM from the provisioning system of the MVNO. In some embodiments, the notification message redirects the wireless device to a lookup server to obtain information for downloading and installing the secondary eSIM.

Other aspects and advantages of the invention will become apparent from the following detailed description taken in conjunction with the accompanying drawings which illustrate, by way of example, the principles of the described embodiments.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Figure 1:
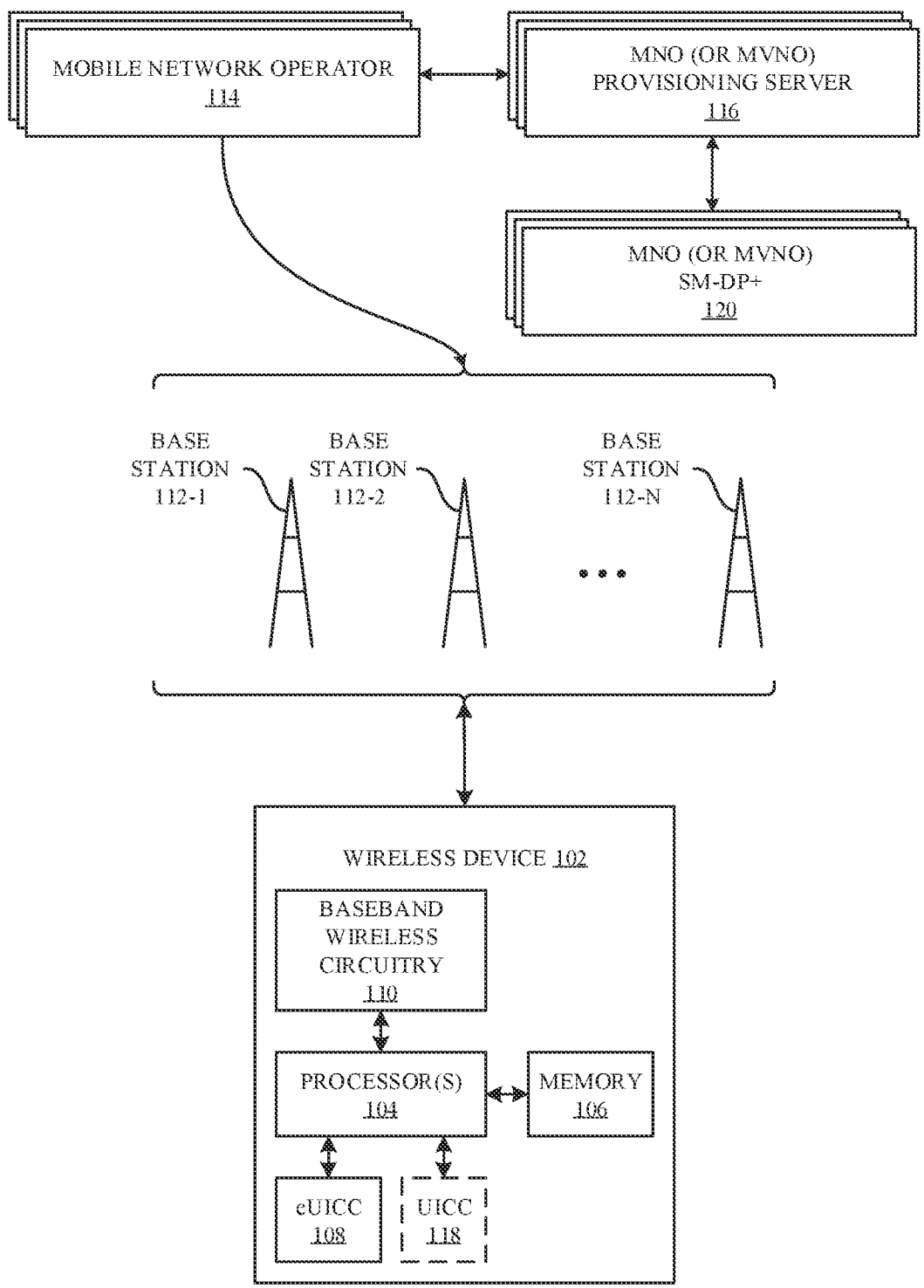
FIG. 1 illustrates a block diagram of different components of an exemplary system configured to implement the various techniques described herein, according to some embodiments.

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

The described embodiments set forth techniques for managing provisioning of a secondary electronic subscriber identity module (eSIM) to a wireless device for access to a limited deployment, secondary wireless network managed by a mobile virtual network operator (MVNO). The secondary wireless network is used to supplement access via a primary wireless network managed by a mobile network operator (MNO) that provides access to cellular wireless services of the MVNO via a subleasing arrangement, where the MNO owns and manages the primary wireless network and subscribers to the MVNO access cellular wireless services via the MNO primary wireless network. The MNVO, referred to as carrier B, uses the cellular radio network of the MNO, referred to as carrier A, to provide cellular wireless services to a wireless device of an MNVO subscriber. The MNVO has a business agreement with the MNO to allow MVNO subscribers to access cellular wireless services of the MVNO via the cellular wireless network of the MNO. The user of the wireless device subscribes to cellular wireless services from the MVNO, and the MVNO can provide cellular wireless services without deploying an extensive cellular wireless network and instead leverage the capabilities of the cellular wireless network of the MNO.

The MVNO can choose to deploy its own cellular wireless network in limited geographic areas where users may be concentrated, such as in city centers. In some cases, the MVNO can also deploy a cellular wireless network in a geographic area in which the MNO cellular wireless network does not reach. The MVNO can overlay its cellular wireless network in areas covered by the MNO cellular wireless network. The MVNO cellular wireless network can allow the MNVO to offload traffic for select services, such as data packet communication, from the MNO cellular wireless network to the MVNO cellular wireless network when capacity of the MVNO cellular wireless network and/or signal conditions (e.g., sufficiently strong signals for communication with the MVNO cellular wireless network by the wireless device) allow for offloading. Offloading data traffic for some MVNO users from the MNO cellular wireless network to the MVNO cellular wireless network can provide cost savings for the MVNO.

Access to cellular wireless services of the MVNO via the MNO wireless network can use a primary SIM, which can include credentials for access the MNO wireless network and be branded for MNVO cellular wireless services, or use an equivalent primary eSIM installed in the wireless device. Access to cellular wireless services of the MVNO via the MVNO wireless network can use a secondary eSIM, separate from the primary SIM/eSIM, and installed on an eUICC of the wireless device. Provisioning the secondary eSIM to the wireless device that includes the primary SIM/eSIM allows for subsequent offloading of select services used by the wireless device from the MNO cellular wireless network to the MVNO cellular wireless network. The MVNO cellular wireless network can be limited in reach and therefore to allow for extensive geographic regional and/or national coverage, the wireless device can continue to include the primary SIM/eSIM in addition to the provisioned secondary eSIM. In some embodiments, the MVNO cellular wireless network can use radio frequency (RF) band separate from the RF band used for access to the MNO cellular wireless network. In some embodiments, the MVNO cellular wireless network uses a Citizens Broadband Radio Service (CBRS) RF band.

The primary SIM/eSIM and the secondary eSIM can be associated with a common mobile station international subscriber directory number (MSISDN) value, also referred to as a phone number. In some embodiments, a wireless device that includes the primary SIM/eSIM and the secondary eSIM defaults to using the primary SIM/eSIM for access to cellular wireless voice services when the MNO wireless network is available. In some embodiments, the wireless device defaults to using the secondary eSIM for access to cellular wireless data services when the MVNO wireless network is available. The wireless device includes a first cellular wireless protocol stack associated with the primary SIM/eSIM for managing cellular wireless communication for MVNO cellular wireless services via connections to the MNO wireless network. The wireless device further includes a second cellular wireless protocol stack associated with the secondary eSIM for managing cellular wireless communication for MVNO cellular wireless services via connections to the MVNO wireless network. Select cellular wireless communication traffic of the MVNO, such as packet data communication, can be offloaded from the MNO wireless network to the MVNO wireless network. In some embodiments, packet data communication is offloaded to the MVNO wireless network when available within a geographic region in which the user's wireless device is operating. In some embodiments, packet data communication is offloaded to the MVNO wireless network when performance criteria for the MVNO wireless network are satisfied, e.g., a signal strength and/or signal quality for cellular wireless connections with the MVNO wireless network meet corresponding criteria alone or when compared to corresponding performance metrics for cellular wireless connections to the MNO wireless network. In some embodiments, the wireless device connects to the MVNO wireless network for access to one or more MVNO cellular wireless services when access via the MNO wireless network is unavailable and access via the MVNO cellular wireless network is available.

Provisioning of the secondary eSIM to the wireless device can be triggered by the wireless device, by a network entity of the MVNO cellular wireless network, or by a network entity of a device manufacturer of the wireless device. In some embodiments, a wireless device, i) upon booting up and/or ii) after installation of a primary SIM or eSIM that provides access to MVNO cellular wireless services via an MNO cellular wireless network, the wireless determines that a secondary eSIM for access to MVNO cellular wireless services via an MVNO cellular wireless network is required. The wireless device can initiate provisioning of the secondary eSIM directly, e.g., by communicating with an entitlement server of the MVNO cellular wireless network, or indirectly, e.g., by attaching to the MNO cellular wireless network using the primary SIM/eSIM, where the MNO cellular wireless network communicates with the MVNO cellular wireless network, or by providing SIM/eSIM information to a device services server of a manufacturer of the wireless device, which determines whether the secondary eSIM needs to be installed on the wireless device. In some embodiments, provisioning the secondary eSIM to the wireless device includes: i) obtaining information for the secondary eSIM, ii) binding the secondary eSIM to the primary SIM/eSIM, and iii) downloading and installing the secondary eSIM on an eUICC of the wireless device. Provisioning of the secondary eSIM can be based at least in part on a determination by the wireless device or by a network entity that the wireless device includes a primary SIM/eSIM for MVNO cellular wireless service installed (and in some cases also active) and does not include a secondary eSIM for MVNO cellular wireless service installed.

The wireless device can be required to provide an indication of authorization to download and install the secondary eSIM to the eUICC of the wireless device. In some embodiments, the wireless device initiates provisioning of the secondary eSIM via an entitlement server of the MVNO cellular wireless network and authenticates based on credentials of the primary SIM/eSIM that provides access to MVNO cellular wireless services via the MNO cellular wireless network. The entitlement server can obtain an authentication challenge from an authentication system of the MNO cellular wireless network and provide the authentication challenge to the wireless device, which can return a challenge response generated by the SIM card (for a primary SIM) or by the eUICC (for a primary eSIM) to the entitlement server. The entitlement server can forward the challenge response to the authentication system of the MNO cellular wireless network, which can return an authentication success message indicating that authentication of the wireless device succeeded. Upon successful authentication, the entitlement server of the MVNO can trigger a provisioning system of the MVNO, e.g., a provisioning server and a subscription manager—data preparation plus (SM-DP+), to set up the secondary eSIM for the wireless device. In some embodiments, the entitlement server of the MVNO cellular wireless network provides secondary eSIM information, such as a unique identifier, e.g., an international circuit card identifier (ICCID) value or hashed version of the ICCID value, for the secondary eSIM to the wireless device and/or a network address, e.g., a universal resource locator (URL) or fully qualified domain name (FQDN) for the network provisioning system managed by the MVNO from which to obtain the secondary eSIM. The wireless device 102 can download and install the secondary eSIM from the MVNO provisioning system, use credentials of the secondary eSIM to attach to the MVNO cellular wireless network, and provide notification to the MVNO provisioning system after successful attachment using the secondary eSIM has occurred (or indicating successful download and installation of the secondary eSIM).

In some embodiments, provisioning of the secondary eSIM to the wireless device is initiated based on the wireless device attaching to the MNO cellular wireless network using credentials of the primary SIM/eSIM for access to MVNO cellular wireless services via the MNO cellular wireless network. The MNO cellular wireless network provides a hardware identifier, e.g., international mobile equipment identifier (IMEI) value, of the wireless device to a provisioning system of the MVNO cellular wireless network after attachment of the wireless device. The MVNO provisioning system determines whether a secondary eSIM needs to be installed on the eUICC of the wireless device. The MVNO provisioning system can obtain a unique identifier for the eUICC of the wireless device, e.g., an eUICC identifier (EID) value, from a query server managed by a manufacturer of the wireless device based on the IMEI value provided to the query server. The MVNO provisioning system can maintain a database of EID values with indications of whether a secondary eSIM is installed on an eUICC identified by an EID value. When i) the wireless device attached to the MNO cellular wireless network includes the primary SIM/eSIM (for access to the MVNO cellular wireless services via the MNO cellular wireless network) and ii) the eUICC of the wireless device identified by the EID value does not include a secondary eSIM (for access to all or a portion of MVNO cellular wireless services via the MVNO cellular wireless network), the provisioning system of the MVNO cellular wireless network triggers provisioning of the secondary eSIM to the wireless device. The MVNO provisioning system can set up the secondary eSIM and send an indication to a device services server maintained by the manufacturer of the wireless device that the secondary eSIM is available and pending download to the wireless device. The device services server can trigger a push notification server managed by the manufacturer of the wireless device to send a notification message to the wireless device, the notification message including information for downloading and installation of the secondary eSIM from the MVNO provisioning system. Information can include a unique identifier for the secondary eSIM, such as an ICCID value or a hashed version of the ICCID value, and a network address, such as a universal resource locator (URL) or fully qualified domain name (FQDN) for accessing the MVNO provisioning system. The wireless device can download and install the secondary eSIM on the eUICC of the wireless device, attach to the MVNO cellular wireless network using credentials of the secondary eSIM, and notify the MVNO provisioning system regarding successful attachment (or regarding successful download and installation of the secondary eSIM).

In some embodiments, provisioning of the secondary eSIM to the wireless device is initiated based on a device services server maintained by a manufacturer of the wireless device determining that the secondary eSIM is required to be downloaded and installed on the eUICC of the wireless device. The wireless device can send a message to the device services server reporting on SIMs and/or eSIMs included in the wireless device. In some embodiments, the message includes an indication whether a primary SIM/eSIM for access to MVNO cellular wireless services via an MNO cellular wireless network is present in the wireless device and whether a secondary eSIM for access to MVNO cellular wireless services via an MVNO cellular wireless network is present on an eUICC of the wireless device. When the wireless device includes the primary SIM/eSIM but does not include the secondary eSIM, the device services server obtains an authentication token from a provisioning system of the MVNO cellular wireless network and provides the authentication token to the wireless device. The wireless device can provide the authentication token to an entitlement server of the MVNO cellular wireless network to authenticate the wireless device and indicate authorization to obtain the secondary eSIM from the MVNO provisioning system. By sending the authentication token to the MVNO entitlement server, the wireless device initiates provisioning of the secondary eSIM. The MVNO provisioning system can set up the secondary eSIM and provide eSIM information to the wireless device. The eSIM information can include a unique identifier of the secondary eSIM, e.g., an ICCID value or hashed version of the ICCID value. The MVNO provisioning system can also provide, to a device services server maintained by the manufacturer of the wireless device, an indication of availability of the secondary eSIM for the wireless device. The manufacturer device services server can trigger a notification message to be sent to the wireless device by a push notification server, the notification message including information for downloading and installation of the secondary eSIM from the provisioning system of the MVNO cellular wireless network. In some embodiments, the notification message includes a network address, e.g., URL or FQDN, for the MVNO provisioning system from which to download and install the secondary eSIM. The wireless device can download and install the secondary eSIM, attach to the MVNO cellular wireless network using credentials of the secondary eSIM, and notify the MVNO provisioning system after successful attachment using the secondary eSIM (and/or after successful installation of the secondary eSIM).

These and other embodiments are discussed below with reference to FIGS. 1-12; however, those skilled in the art will readily appreciate that the detailed description given herein with respect to these figures is for explanatory purposes only and should not be construed as limiting.

FIG. 1 illustrates a block diagram of different components of a system 100 that is configured to implement the various techniques described herein, according to some embodiments. More specifically, FIG. 1 illustrates a high-level overview of the system 100, which, as shown, includes a wireless device 102, which can also be referred to as a device, a wireless device, a mobile device, a user equipment (UE), and the like, a group of base stations 112-1 to 112-N that are managed by different Mobile Network Operators (MNOs) 114, and a set of provisioning servers 116 that are in communication with the MNOs 114, where a provisioning server 116 can be associated with an MNO or with a mobile virtual network operator (MVNO). An MNO can provide cellular wireless services via its own physical cellular wireless network (which can include base stations 112), while an MVNO can provide cellular wireless services by leasing access via the physical cellular wireless network of an MNO. The provisioning servers 116 can be communicatively coupled to subscription management-data preparation plus (SM-DP+) units 120 that provide databases of relevant subscription information for subscribers of cellular wireless services of the associated MNO. An MNO (or MVNO) provisioning server 116 together with an MNO (or MVNO) SM-DP+120 can be referred to as a provisioning system. Additional MNO (and/or MVNO) infrastructure servers, such as used for authentication, account management, and billing are not shown. The wireless device 102 can represent a mobile computing device (e.g., an iPhone®, an iPad®, or an Apple Watch by Apple®), the base stations 112-1 to 112-n can represent cellular wireless network entities, including evolved NodeBs (eNodeBs or eNBs) for fourth generation (4G) long term evolution (LTE) cellular wireless networks and/or next generation NodeBs (gNodeBs or gNB) for fifth generation (5G) new radio (NR) cellular wireless networks, that are configured to communicate with the wireless device 102. The MNOs 114 can represent different wireless service providers that provide specific cellular wireless services (e.g., voice and data) to which the wireless device 102 can subscribe, such as via a subscription account for a user of the wireless device 102 using the cellular wireless network of the MNO, while an MVNO can provide cellular wireless services via the cellular wireless network of an associated MNO.

As shown in FIG. 1, the wireless device 102 can include processing circuitry, which can include one or more processor(s) 104 and a memory 106, storing instructions for execution on the one or more processor(s) 104, an embedded Universal Integrated Circuit Card (eUICC) 108, and baseband wireless circuitry 110 used for transmission and reception of cellular wireless radio frequency signals. The baseband wireless circuitry 110 can include analog hardware components, such as antennas and amplifiers, as well as digital processing components, such as signal processors (and/or general/limited purpose processors) and associated memory storing instructions for execution on the signal processors. In some embodiments, the wireless device 102 includes one or more physical UICCs 118, also referred to as Subscriber Identity Module (SIM) cards, in addition to the eUICC 108. The components of the wireless device 102 work together to enable the wireless device 102 to provide useful features to a user of the wireless device 102, such as cellular wireless network access, non-cellular wireless network access, localized computing, location-based services, and Internet connectivity. The eUICC 108 can be configured to store multiple electronic SIMs (eSIMs) for accessing cellular wireless services provided by different MNOs 114 by connecting to their respective cellular wireless networks through base stations 112-1 to 112-N (or provided by MVNOs by connecting via cellular wireless networks of MNOs 114 associated with the MVNOs). The eUICC 108 can be configured to store and manage one or more eSIMs for one or more MNOs 114 (or MVNOs) for different subscriptions to which the wireless device 102 is associated. To be able to access services provided by an MNO (or MVNO), an eSIM can be reserved for download and installation to the eUICC 108. In some embodiments, the eUICC 108 obtains one or more eSIMs from one or more associated MNO provisioning systems, e.g., provisioning servers 116 and SM-DP+ 120. The provisioning systems can be maintained by the respective MNOs 114 and MVNOs, by a device manufacturer, by third party entities, and the like. Communication of eSIM data between an MNO (or MVNO) provisioning server 116 and/or MNO (or MVNO) SM-DP+ 120 and the eUICC 108 of the wireless device 102 (or to processing circuitry of the wireless device 102 external to the eUICC 108, e.g., the processor 104) can use a secure communication channel.

Figure 2:
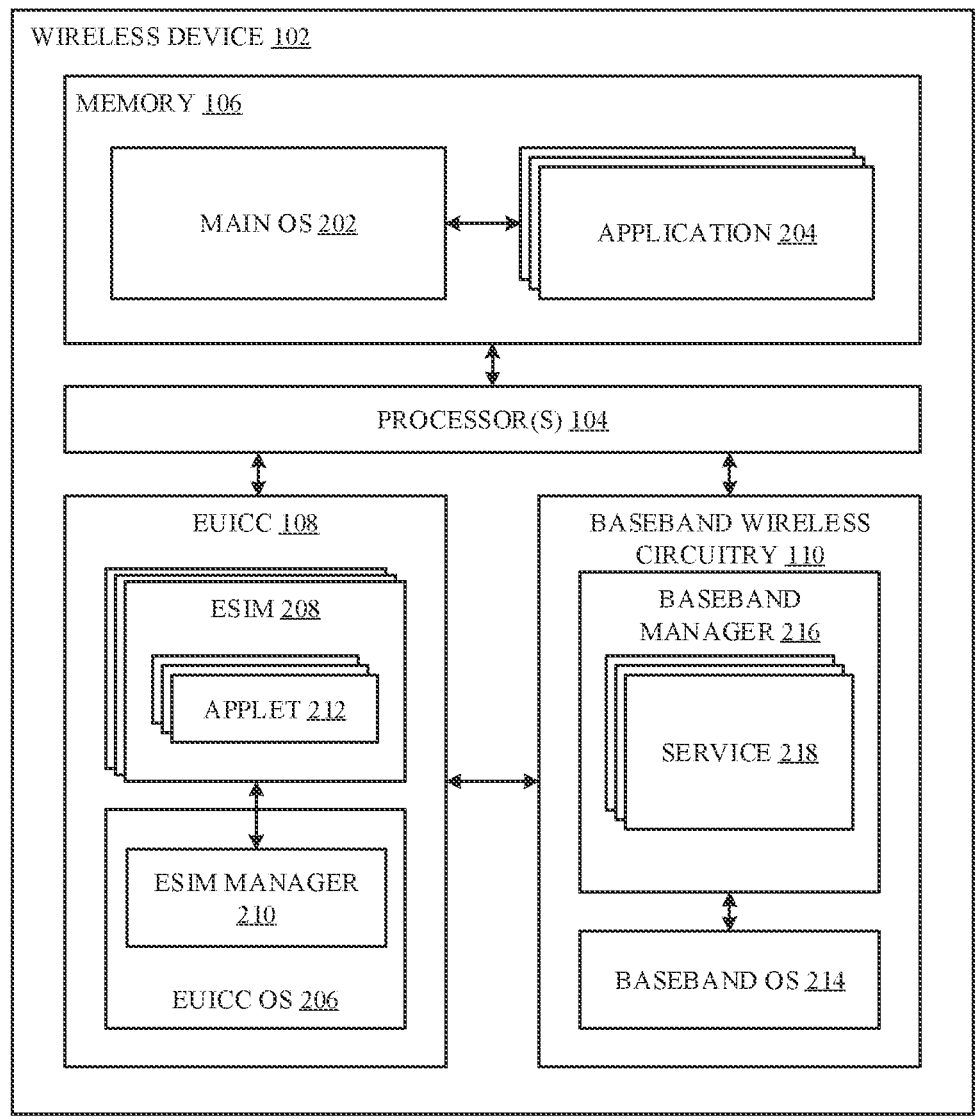
FIG. 2 illustrates a block diagram of a more detailed view of exemplary components of the system of FIG. 1, according to some embodiments.

FIG. 2 illustrates a block diagram of a more detailed view 200 of particular components of the wireless device 102 of FIG. 1, according to some embodiments. (Optionally, the wireless device 102 can also include one or more UICCs 118, i.e., SIM cards, that interface with a processor 104 and with baseband wireless circuitry 110 of the wireless device 102.) As shown in FIG. 2, the processor(s) 104, in conjunction with memory 106, can implement a main operating system (OS) 202 that is configured to execute applications 204 (e.g., native OS applications and user applications). As also shown in FIG. 2, the eUICC 108 can be configured to implement an eUICC OS 206 that is configured to manage hardware resources of the eUICC 108 (e.g., a processor and a memory embedded in the eUICC 108). The eUICC OS 206 can also be configured to manage eSIMs 208 that are stored by the eUICC 108, e.g., by downloading, installing, deleting, enabling, disabling, modifying, or otherwise performing management of the eSIMs 208 within the eUICC 108 and to provide baseband wireless circuitry 110 with access to the eSIMs 208 to provide access to wireless services for the wireless device 102. The eUICC 108 OS can include an eSIM manager 210, which can perform management functions for various eSIMs 208. According to the illustration shown in FIG. 2, each eSIM 208 can include a number of applets 212 that define the manner in which the eSIM 208 operates. For example, one or more of the applets 212, when implemented in conjunction with baseband wireless circuitry 110 and the eUICC 108, can be configured to enable the wireless device 102 to communicate with an MNO 114 and provide useful features (e.g., phone calls and internet access) to a user of the wireless device 102.

As also shown in FIG. 2, the baseband wireless circuitry 110 of the wireless device 102 can include a baseband OS 214 that is configured to manage hardware resources of the baseband wireless circuitry 110 (e.g., a processor, a memory, different radio components, etc.). According to some embodiments, the baseband wireless circuitry 110 can implement a baseband manager 216 that is configured to interface with the eUICC 108 to establish a secure channel with an MNO provisioning server 116 and obtaining information (such as eSIM data) from the MNO provisioning server 116 for purposes of managing eSIMs 208. The baseband manager 216 can be configured to implement services 218, which represents a collection of software modules that are instantiated by way of the various applets 212 of enabled eSIMs 208 that are included in the eUICC 108. For example, services 218 can be configured to manage different connections between the wireless device 102 and MNOs 114 according to the different eSIMs 208 that are enabled within the eUICC 108.

Figure 3:
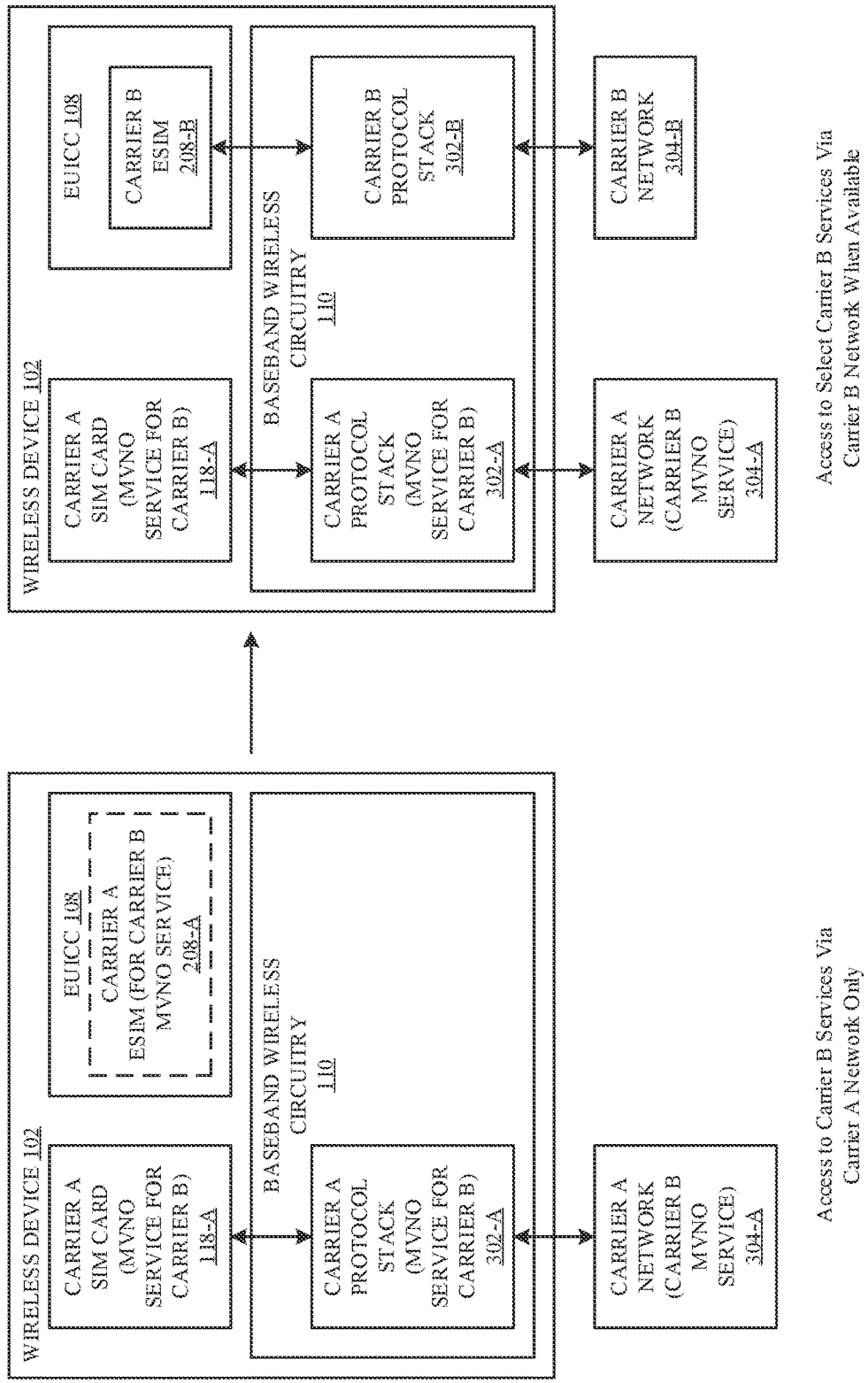
FIG. 3 illustrates a diagram of an example of adding a secondary eSIM to a wireless device for access to an MVNO cellular wireless network, according to some embodiments.

FIG. 3 illustrates a diagram 300 of a wireless device 102 initially configured with a UICC (SIM card) 118-A for access to cellular wireless services of an MVNO (indicated as Carrier B) via a physical cellular wireless network of an associated MNO 114 (indicated as Carrier A). While FIG. 3 illustrates a physical UICC 118-A, the same functionality for access to MVNO cellular wireless services can be provided by an eSIM 208 installed on the eUICC 108 of the wireless device 102. The wireless device 102 uses credentials of the SIM card 118-A to connect to the cellular wireless network of the MNO (Carrier A) 304-A to access cellular wireless services of the MVNO (Carrier B). The MVNO (Carrier B) has a business agreement (e.g., a leasing arrangement) with the MNO (Carrier A) to provide cellular wireless network access for the MVNO's subscribers. The baseband wireless circuitry 110 of the wireless device 102 instantiates a cellular wireless protocol stack 302-A for managing communication with the MNO (Carrier A) cellular wireless network 304-A. Access to the MVNO (Carrier B) services using the SIM card 118-A is only via the MNO cellular wireless network 304-A. The MVNO (Carrier B) can deploy a new, overlay cellular wireless network 304-B limited to particular geographic regions, e.g., metropolitan centers or other dense areas of deployment, to allow for offloading select cellular wireless service traffic from the MNO cellular wireless network 304-A to the MVNO cellular wireless network 304-B. For the wireless device 102 to access the MVNO cellular wireless network 304-B, a secondary eSIM 208-B (associated with carrier B) can be provisioned to and installed on an eUICC 108 of the wireless device 102 in parallel with the primary SIM card 118-A (associated with carrier A that provides access to services of carrier B). Credentials on the primary SIM card 118-A may be managed by the MNO (Carrier A), and it may be infeasible to modify the primary SIM card 118-A to allow for access to the cellular wireless network of the MVNO (Carrier B). Therefore, a secondary eSIM 208-B managed by the MVNO (Carrier B) can be provisioned to the wireless device 102. The baseband wireless circuitry 110 of the wireless device 102 instantiates a second cellular wireless protocol stack 302-B for managing communication with the MVNO (Carrier B) cellular wireless network 304-B. The secondary eSIM 208-B can provide access to select cellular wireless services of the MVNO via the MVNO cellular wireless network 304-B, which can provide a cost savings for the MVNO. In some cases, the secondary eSIM 208-B can be provisioned to and installed on the wireless device 102 silently, without obtaining user consent. In some embodiments, the secondary eSIM 208-B is associated with the same mobile station international subscriber directory number (MSISDN) value, e.g., phone number, as the primary SIM 118-A. In some embodiments, the MVNO controls offloading of select cellular wireless service traffic, such as packet data traffic, from the MNO cellular wireless network 304-A to the MVNO cellular wireless network 304-B, without requiring intervention or management by a user of the wireless device 102 (of by a subscriber to the MVNO cellular wireless services provided by the primary SIM 118-A and the secondary eSIM 208-B). Offloading can occur based on various criteria being satisfied, such as network availability, network loading, signal strength, signal quality, quality of service (QoS) requirements for offloaded traffic, and the like. In some embodiments, a cellular wireless service management application operational on the baseband wireless circuitry 110 and/or on an external processor 104 can coordinate offloading cellular wireless service traffic from the MNO cellular wireless network 304-A to the MVNO cellular wireless network 304-B. In some embodiments, data traffic is offloaded to the MVNO cellular wireless network 304-B, when available, while voice traffic remains on the MNO cellular wireless network 304-A. In some embodiments, voice traffic for the wireless device 102 is communicated via the MVNO cellular wireless network 304-B when the MNO cellular wireless network 304-A is not available in a geographic region in which the wireless device 102 is operating.

Figure 4:
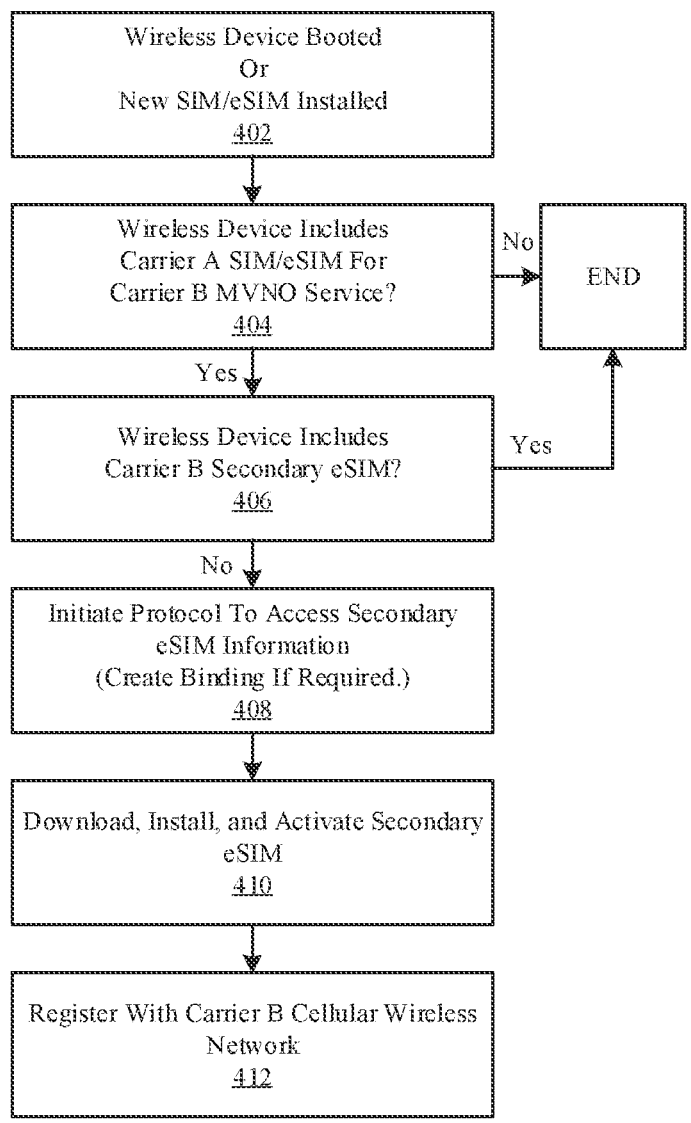
FIG. 4 illustrates a flowchart of an example of provisioning and installing a secondary eSIM for access to an MVNO cellular wireless network to a wireless device, according to some embodiments.

FIG. 4 illustrates a flowchart 400 of an example of provisioning and installing a secondary eSIM 208-B for access to an MVNO (Carrier B) cellular wireless network 304-B to a wireless device 102. At 402, the wireless device 102 is booted up, e.g., from a powered down state, and/or a new SIM card 118 or eSIM 208 is installed in the wireless device 102. At 404, the wireless device 102 can be configured to check for the presence of a primary SIM 118 or primary eSIM 208 used for access to cellular wireless services of an MVNO (Carrier B) via a cellular wireless network of an associated MNO 114 (Carrier A). When there is no MNO (Carrier A) primary SIM/eSIM for MVNO (Carrier B) service installed in the wireless device 102, the provisioning process can end. When there is an MNO (Carrier A) primary SIM/eSIM for MVNO (Carrier B) service installed, the wireless device 102, at 406, can determine whether there is also a secondary eSIM 208-B, for access to cellular wireless services of the MVNO (Carrier B) via an MVNO cellular wireless network 304-B, installed. When there is an MVNO (Carrier B) secondary eSIM 208-B already installed, the provisioning process can end. When there is not MVNO (Carrier B) secondary eSIM 208-B installed, the wireless device 102, at 408, can initiate a provisioning protocol to access secondary eSIM 208-B information for obtaining the secondary eSIM 208-B for the wireless device 102. In some embodiments, the provisioning protocol creates a binding between the MNO (Carrier A) primary SIM/eSIM for MVNO (Carrier B) service installed in the wireless device 102 with a newly installed (or to be installed) MVNO (Carrier B) secondary eSIM 208-B. At 410, the wireless device 102 downloads (e.g., from a provisioning system of the MVNO), installs, and activates the MVNO (Carrier B) secondary eSIM 208-B on an eUICC 108 of the wireless device 102. At 412, the wireless device 102 can register for access to select cellular wireless services of the MVNO with the MVNO (Carrier B) cellular wireless network 304-B.

Figure 5A:
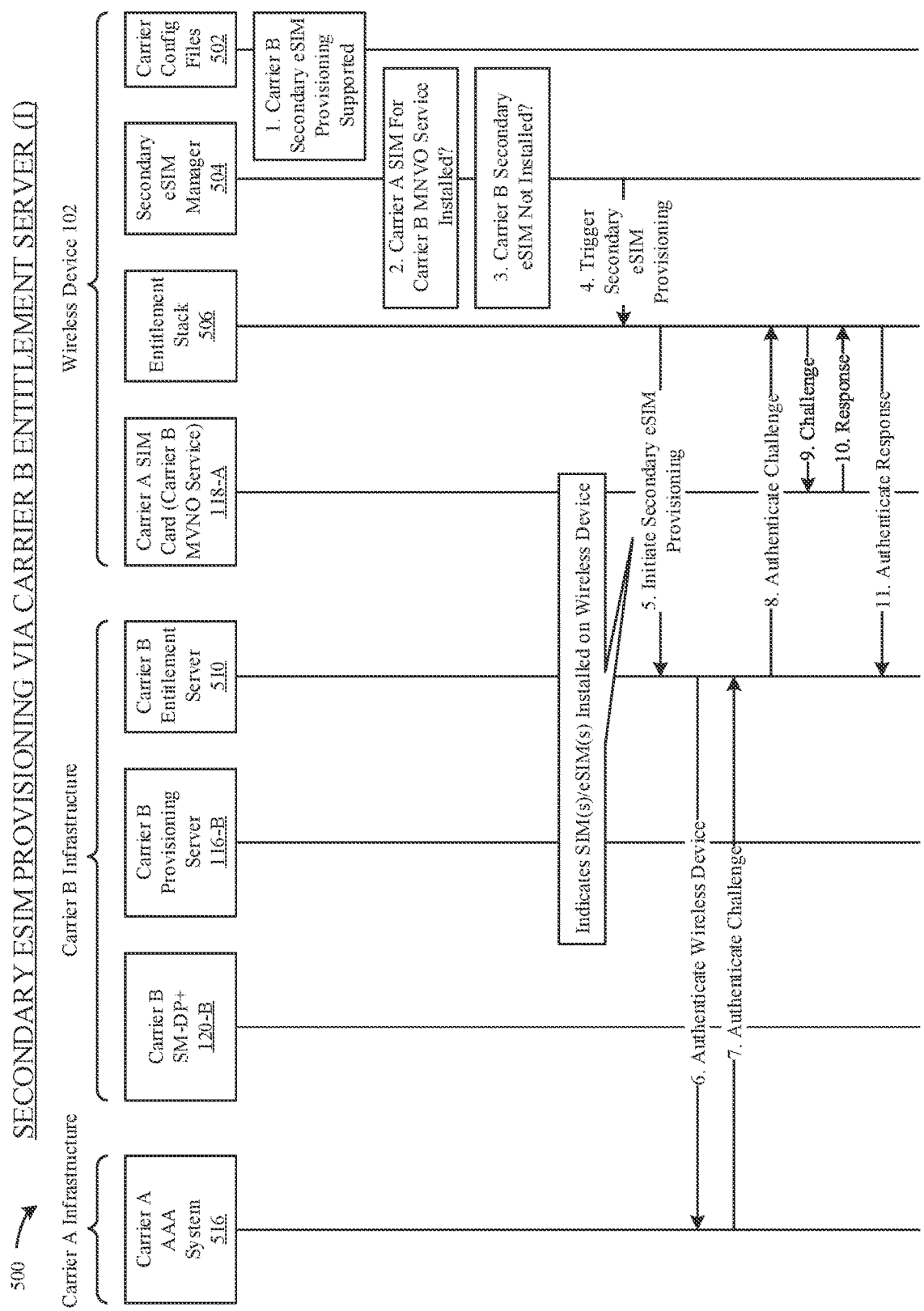
FIGS. 5A and 5B illustrate diagrams of an example of provisioning and installation of a secondary eSIM for access to an MVNO cellular wireless network to a wireless device anchored by an entitlement server of the MVNO, according to some embodiments.
Figure 5B:
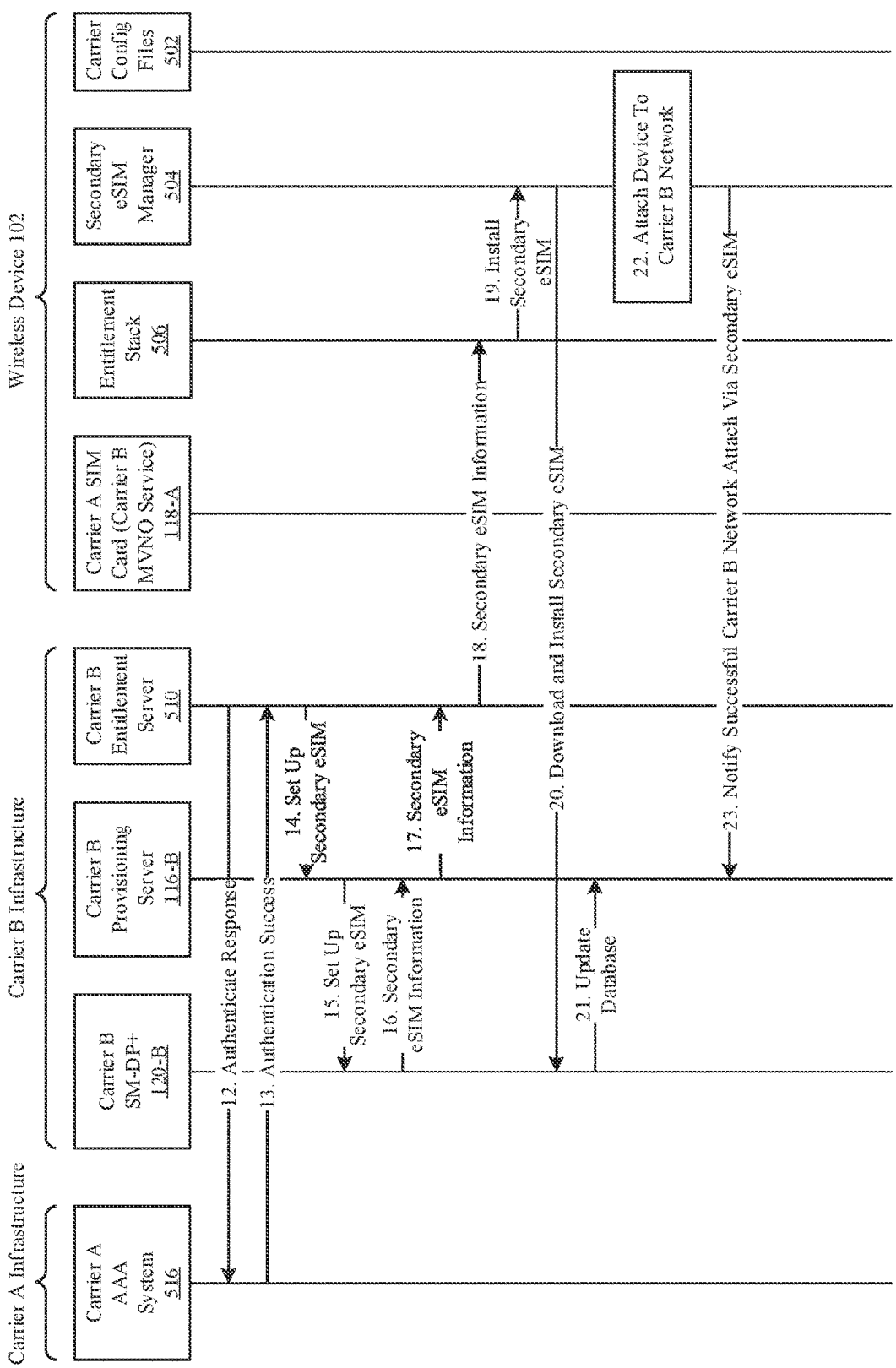

FIGS. 5A and 5B illustrate diagrams 500, 550 of an example of provisioning and installation of a secondary (Carrier B) eSIM 208-B for access to an MVNO (Carrier B) cellular wireless network 304-B to a wireless device 102 anchored by an entitlement server 510 of the MVNO (Carrier B). The wireless device 102 includes carrier configuration files 502 that summarize properties of cellular wireless service for the wireless device 102 via different carriers (MNOs/MVNOs). At a first step, the wireless device 102 determines, based on a carrier configuration file 502 for MVNO (Carrier B) cellular wireless service supports provisioning of a secondary eSIM 208-B for access to MVNO (Carrier B) cellular wireless service. When secondary eSIM provisioning for the MVNO (Carrier B) is supported, at a second step, the wireless device 102 determines whether a primary SIM 118-A or primary eSIM 208-A used for access to cellular wireless services of the MVNO (Carrier B) via a cellular wireless network of an associated MNO 114 (Carrier A) is installed in the wireless device 102. At a third step, the wireless device 102 determines whether a secondary eSIM 208-B is not already installed in the wireless device 102. When provisioning of a secondary eSIM 208-B is supported, a primary SIM 118-A (or primary eSIM 208-A) is installed, and a secondary eSIM 208-B is not installed, a secondary eSIM manager 504 of the wireless device 102 triggers provisioning of the secondary eSIM 208-B by an entitlement stack 506 of the wireless device 102. The entitlement stack 506, at a fifth step, sends a message to the entitlement server 510 of the MVNO (Carrier B) to initiate the secondary eSIM 208-B provisioning to the wireless device 102. The message to the entitlement server 510 of the MVNO (Carrier B) can include an indication of one or more SIMs 118 and/or eSIMs 208 installed in the wireless device 102. In some embodiments, the message sent to the entitlement server 510 of the MVNO (Carrier B) includes an indication of all SIMs 118 and eSIMs 208 installed in the wireless device 102. In some embodiments, the message sent to the entitlement server 510 of the MVNO (Carrier B) includes an indication of the primary SIM 118-A (or primary eSIM 208-A) installed in the wireless device 102 and an indication that the secondary eSIM 208-B is not installed in the wireless device 102. The entitlement server 510 of the MVNO (Carrier B) can use information included in the message to determine whether a secondary eSIM 208 is installed in the wireless device 102. At a sixth step, the entitlement server of the MVNO (Carrier B) sends a message to an authentication, authorization, and accounting (AAA) system 516 of the MNO (carrier A) to authenticate the wireless device 102. The AAA system 516 of the MNO (Carrier A) replies to the entitlement server 510 of the MVNO (Carrier B), at a seventh step, with an authentication challenge. The entitlement server 510 of the MVNO (Carrier B) forwards the authentication challenge, at an eighth step, to the entitlement stack 506 of the wireless device 102. The entitlement stack 506, at a ninth step, forwards the authentication challenge to the MNO (Carrier A) SIM Card 118-A (or to the eUICC 108 for a primary eSIM 208-A) to obtain, at a tenth step, from the MNO (Carrier A) SIM Card 118-A (or the eUICC 108) an authentication response generated by the MNO (Carrier A) SIM Card 118-A (or the eUICC 108) from the authentication challenge and using the primary SIM 118-A (or primary eSIM 208-A). The entitlement stack 506, at an eleventh step, sends the authentication response to the entitlement server 510 of the MVNO (Carrier B), which forwards the authentication response, at a twelfth step, to the AAA system 516 of the MNO (Carrier A) for authentication. When authentication of the wireless device 102 succeeds based on the authentication response from the wireless device 102 (via the entitlement server 510) matches an expected authentication response based on the authentication challenge, the AAA system 516, at a thirteenth step, provides an indication of authentication success to the entitlement server 510 of the MVNO (Carrier B). Responsive to authentication success, the entitlement server 510 of the MVNO (Carrier B), at a fourteenth step, sends a message to the provisioning server 116-B of the MVNO (Carrier B), to set up the secondary eSIM 208-B for the wireless device 102. The provisioning server 116-B of the MVNO (Carrier B), at a fifteenth step, sends a message to an associated SM-DP+ 120-B of the MVNO (Carrier B) to set up the secondary eSIM 208-B for the wireless device 102. At a sixteenth step, the SM-DP+ 120-B of the MVNO (Carrier B) provides information regarding the secondary eSIM 208-B set up for the wireless device 102 to the provisioning server 116-B of the MVNO (Carrier B), which forwards, at a seventeenth step, the secondary eSIM 208-B information to the entitlement server 510 of the MVNO (Carrier B). At an eighteenth step, the entitlement server 510 of the MVNO (Carrier B) forwards the secondary eSIM 208-B information to the entitlement stack 506 of the wireless device 102, which triggers, at a nineteenth step, the secondary eSIM manager 504 of the wireless device 102 to install the secondary eSIM 208-B using at least in part the secondary eSIM 208-B information for obtaining the secondary eSIM 208-B. The secondary eSIM 208-B information can include a unique identifier for the secondary eSIM 208-B, such as an ICCID value for the eSIM 208-B or a hashed version of the ICCID value for the secondary eSIM 208-B. The secondary eSIM 208-B information can alternatively or additionally include a network address, e.g., a URL or FQDN, for the SM-DP+ 120-B of the MVNO (Carrier B) from which to download the secondary eSIM 208-B. At a twentieth step, the secondary eSIM manager 504 of the wireless device 102 downloads from the SM-DP+ 120-B of the MVNO (Carrier B) (or from the provisioning server 116-B) the secondary eSIM 208-B and installs the secondary eSIM 208-B on the eUICC 108 of the wireless device 102. The SM-DP+ 120-B of the MVNO (Carrier B), at a twenty-first step, can provide an update to the provisioning server 116-B of the MVNO (Carrier B) regarding the provisioning of the secondary eSIM 208-B to the wireless device 102. At a twenty-second step, the secondary eSIM manager 504 causes the wireless device 102 to attach to the cellular wireless network of the MVNO (Carrier B) 304-B, when available, using credentials of the secondary eSIM 208-B. At a twenty-third step, the secondary eSIM manager 504 sends a message to the provisioning server 116-B of the MVNO (Carrier B) indicating successful attachment of the wireless device 102 to the cellular wireless network of the MVNO (Carrier B) 304-B, which can indicate to the provisioning server 116-B of the MVNO (Carrier B) that the secondary eSIM 208-B has been successfully installed and activated on the eUICC 108 of the wireless device 102. The SM-DP+ 120-B of the MVNO (Carrier B) and the provisioning server 116-B of the MVNO (Carrier B) can be referred to as a provisioning system of the MVNO (Carrier B) and can be implemented by one or more distinct network entities.

Figure 6A:
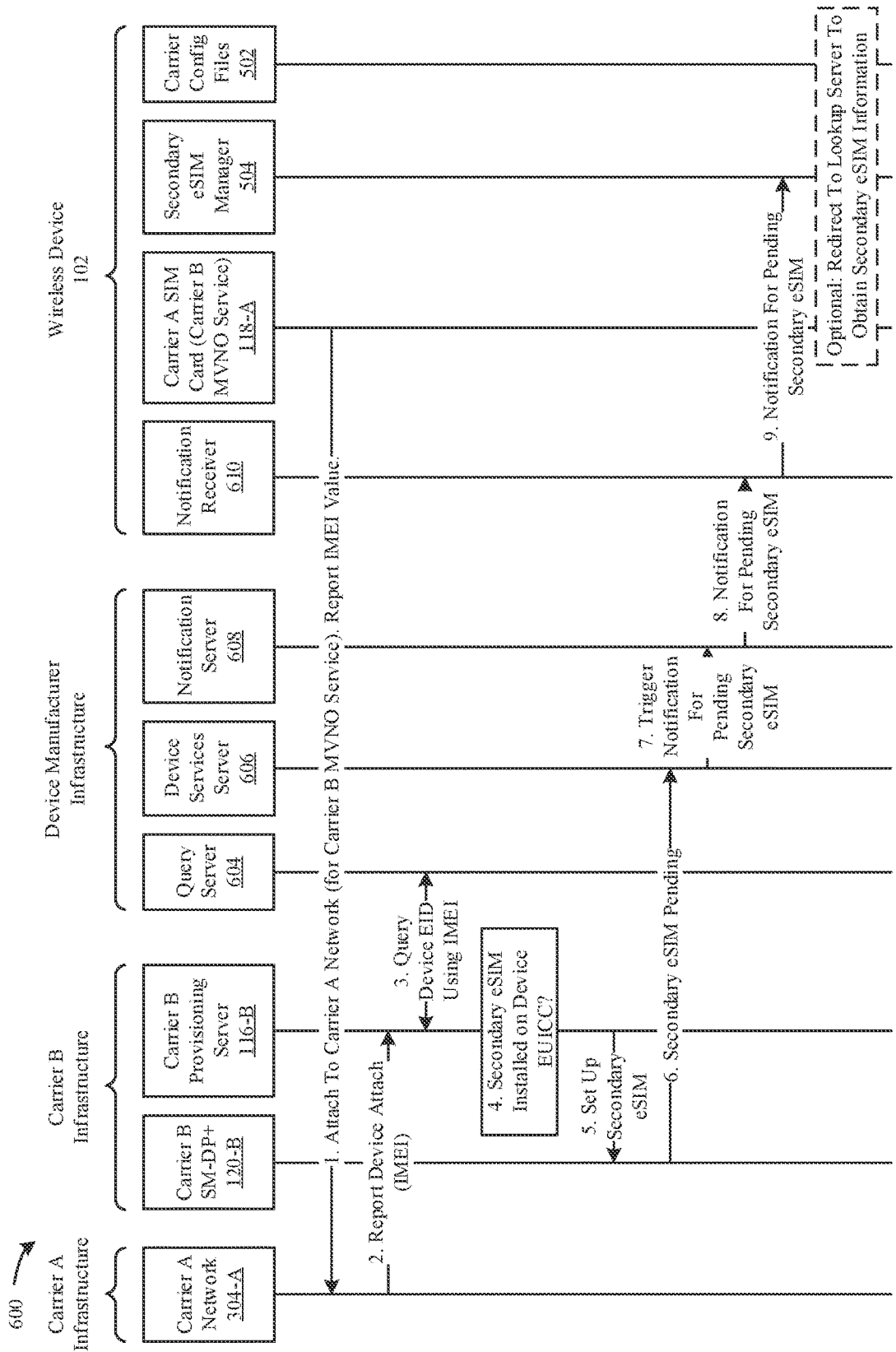
FIGS. 6A and 6B illustrate diagrams of another example of provisioning and installation of a secondary eSIM for access to an MVNO cellular wireless network to a wireless device responsive to an attachment of the wireless device to an MNO cellular wireless network, according to some embodiments.
Figure 6B:
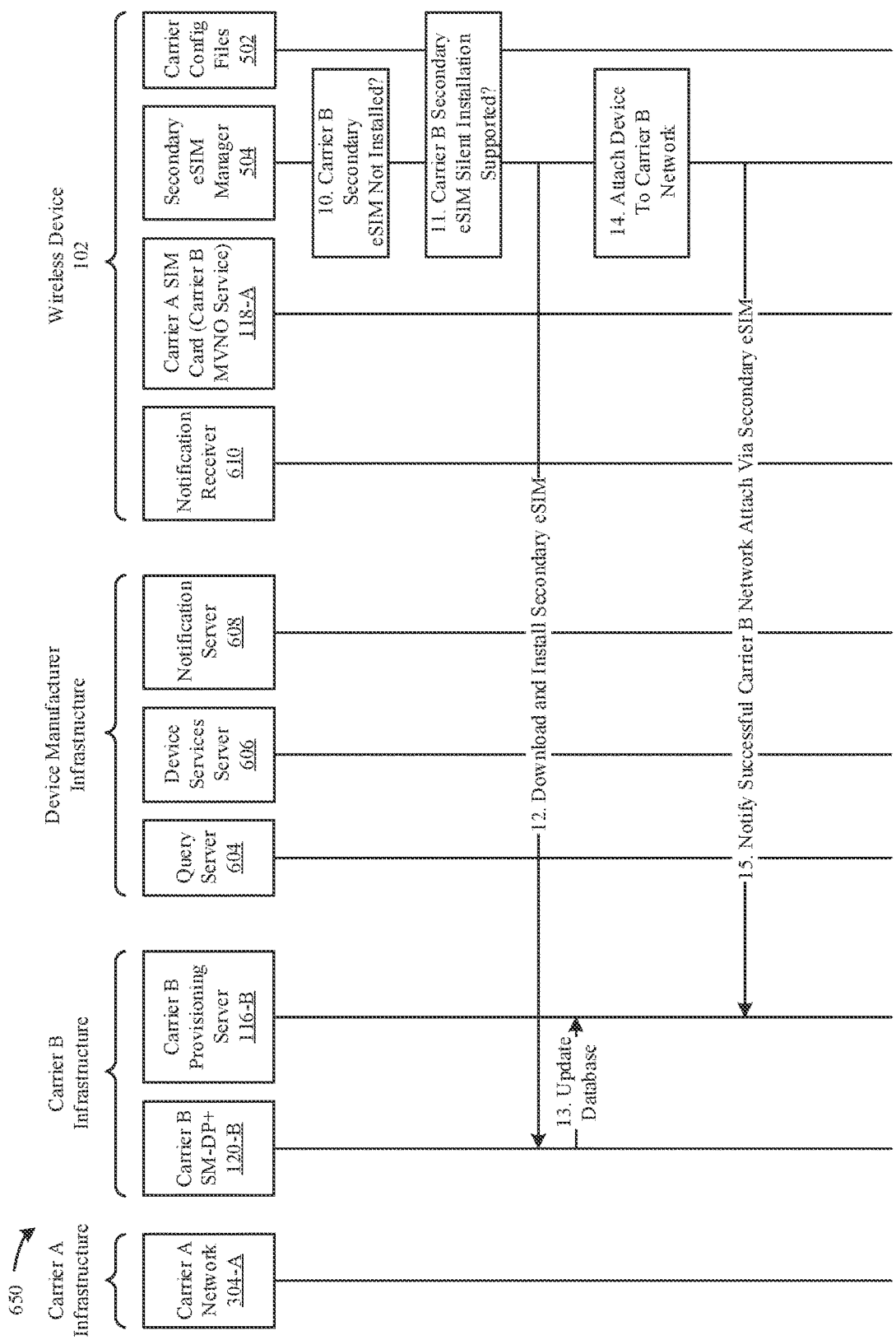

FIGS. 6A and 6B illustrates diagrams 600, 650 of another example of provisioning and installation of a secondary (Carrier B) eSIM 208-B for access to an MVNO (Carrier B) cellular wireless network 304-B to a wireless device 102 responsive to an attachment of the wireless device 102 to an MNO (Carrier A) cellular wireless network 304-A. At a first step, the wireless device 102 attaches to the MNO (Carrier A) cellular wireless network 304-A using credentials of an MNO (Carrier A) primary SIM 118-A used for access to cellular wireless services of an MVNO (Carrier B). The wireless device 102, e.g., the primary SIM 118-A, provides a unique hardware identifier, e.g., an international mobile equipment identifier (IMEI) value, of the wireless device 102 to the MNO (Carrier A) cellular wireless network 304-A. In some embodiments, the MNO (Carrier A) cellular wireless network 304-A requests the IMEI value from the wireless device 102. At a second step, the MNO (Carrier A) cellular wireless network 304-A provides a notification of the attachment of the wireless device 102 to the MNO (Carrier A) cellular wireless network 304-A, along with the IMEI value obtained from the wireless device 102, to an MVNO (Carrier B) provisioning server 116-B. At a third step, the MVNO (Carrier B) provisioning server 116-B sends a request to a query server 604 maintained by a manufacturer of the wireless device 102 to obtain an eUICC identifier (EID) value of the eUICC 108 of the wireless device 102 based on the reported IMEI value. At a fourth step, the MVNO (Carrier B) provisioning server 116-B determines, based on the EID value returned by the query server 604, whether a secondary eSIM 208-B is installed on the eUICC 108 of the wireless device 102. When the eUICC 108 of the wireless device 102 does not have the secondary eSIM 208-B installed, at a fifth step, the MVNO (Carrier B) provisioning server 116-B triggers the MVNO (Carrier B) SM-DP+ 120-B to set up the secondary eSIM 208-B for the wireless device 102. At a sixth step, the MVNO (Carrier B) SM-DP+ 120-B sends a message to a device services server 606 maintained by a manufacturer of the wireless device 102, the message indicting availability of a pending secondary eSIM 208-B for the wireless device 102. At a seventh step, the device services server 606 sends a message to a notification server 608 of the manufacturer of the wireless device 102 to trigger a push notification to be sent to a notification receiver 610 of the wireless device 102, at an eighth step, the push notification indicating the availability of the pending secondary eSIM 208-B for the wireless device 102. At a ninth step, the notification receiver 610 of the wireless device 102 forwards the push notification message indicating availability of the pending secondary eSIM 208-B to a secondary eSIM manager 504. In some embodiments, the push notification message includes eSIM information, such as a network address for the MVNO (Carrier B) SM-DP+ 120-B, e.g., a URL or FQDN of the SM-DP+ 120-B and/or a unique identifier for the pending secondary eSIM 208-B (e.g., an ICCID value) or a hashed version of the ICCID value. In some embodiments, the notification redirects the secondary eSIM manager 504 of the wireless device 102 to a lookup server maintained by the manufacturer of the wireless device 102, which can be the device services server 606 in some cases, to obtain secondary eSIM information, such as the identifier for the pending secondary eSIM 208-B (e.g., an ICCID value) or a hashed version of the ICCID value and/or the network address for the MVNO (Carrier B) SM-DP+ 120-B, e.g., a URL or FQDN of the SM-DP+ 120-B. The secondary eSIM manager 504 determines, at a tenth step, whether the secondary eSIM 208-B is not already installed in the eUICC 108 of the wireless device 102 and, at an eleventh step, whether silent installation of the secondary eSIM 208-B is supported, e.g., that user consent to install the secondary eSIM 208-B on the eUICC 108 of the wireless device 102 is not required. (When silent installation is not supported, the wireless device 102 may optionally obtain user consent for installation of the secondary eSIM 208-B.) At a twelfth step, the wireless device 102 communicates with the MVNO (Carrier B) SM-DP+ 120-B to download and install the secondary eSIM 208-B to the eUICC 108 of the wireless device 102. At a thirteenth step, the MVNO (Carrier B) SM-DP+ 120-B can provide an update to the provisioning server 116-B of the MVNO (Carrier B) regarding the provisioning of the secondary eSIM 208-B to the wireless device 102. At a fourteenth step, the secondary eSIM manager 504 causes the wireless device 102 to attach to the cellular wireless network of the MVNO (Carrier B) 304-B, when available, using credentials of the secondary eSIM 208-B. At a fifteenth step, the secondary eSIM manager 504 sends a message to the provisioning server 116-B of the MVNO (Carrier B) indicating successful attachment of the wireless device 102 to the cellular wireless network of the MVNO (Carrier B) 304-B, which can indicate to the provisioning server 116-B of the MVNO (Carrier B) that the secondary eSIM 208-B has been successfully installed and activated on the eUICC 108 of the wireless device 102.

Figure 7A:
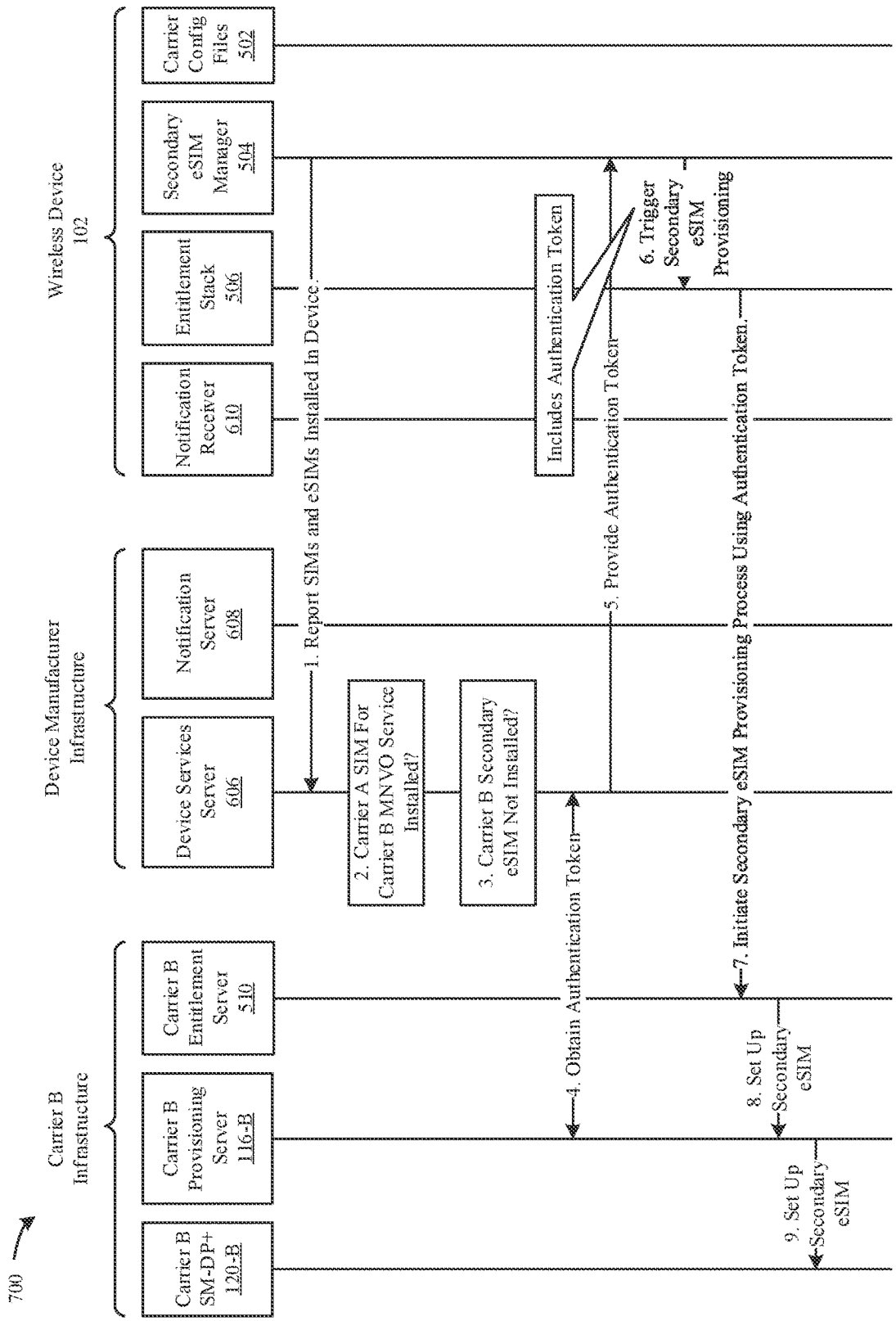
FIGS. 7A and 7B illustrate diagrams of a further example of provisioning and installation of a secondary eSIM for access to an MVNO cellular wireless network to a wireless device anchored by a manufacturer device services server, according to some embodiments.
Figure 7B:
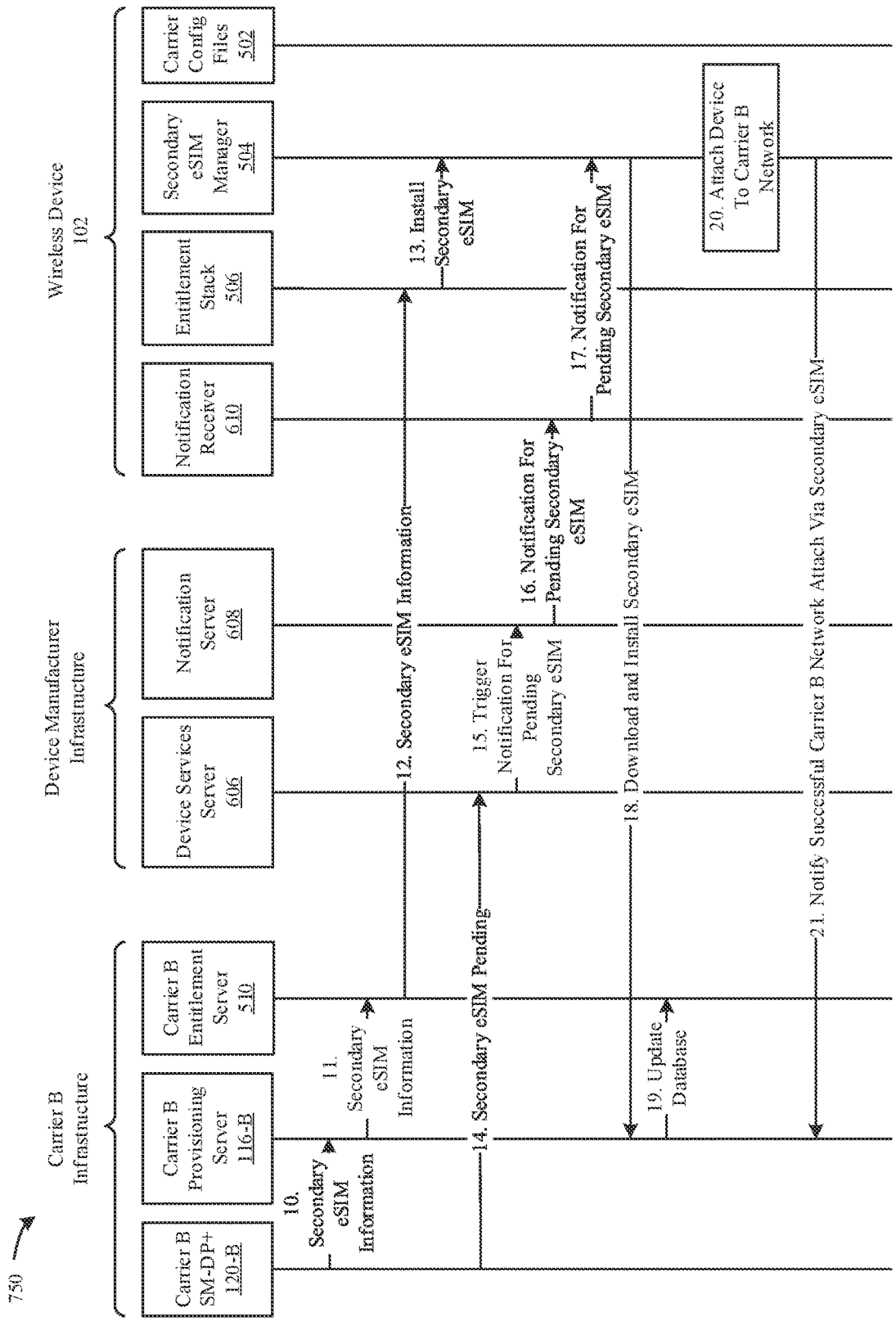

FIGS. 7A and 7B illustrate diagrams 700, 750 of a further example of provisioning and installation of a secondary (Carrier B) eSIM 208-B for access to an MVNO (Carrier B) cellular wireless network 304-B to a wireless device 102 anchored by a device services server 606 maintained by a manufacturer of the wireless device 102. At a first step, a secondary eSIM manager 504 of the wireless device 102 sends a message to the device services server 606 indicating one or more SIMs 118 and/or eSIMs 208 installed in the wireless device 102. In some embodiments, the wireless device 102 indicates all SIMs 118 and eSIMs 208 installed in the wireless device 102 to the device services server 606. In some embodiments, the wireless device 102 indicates whether a primary SIM 118-A (or equivalent primary eSIM 208-A) that provides access to cellular wireless services of the MVNO (Carrier B) via the cellular wireless network of an MNO 114 (Carrier A) 304-A is installed in the wireless device 102. In some embodiments, the wireless device 102 additionally indicates whether a secondary eSIM 208-B that provides access to cellular wireless services of the MVNO (Carrier B) via a cellular wireless network of the MVNO (carrier B) 304-B is installed in the wireless device 102. At a second step, the device services server 606 determines whether a primary SIM 118-A (or equivalent primary eSIM 208-A) that provides access to cellular wireless services of the MVNO (Carrier B) via the cellular wireless network of an MNO 114 (Carrier A) 304-A is installed in the wireless device 102. At a third step, the device services server 606 determines whether a secondary eSIM 208-B that provides access to cellular wireless services of the MVNO (Carrier B) via a cellular wireless network of the MVNO (carrier B) 304-B is installed in the wireless device 102. When i) a primary SIM 118-A (or equivalent primary eSIM 208-A) that provides access to cellular wireless services of the MVNO (Carrier B) via the cellular wireless network of an MNO 114 (Carrier A) 304-A is installed in the wireless device 102 and ii) a secondary eSIM 208-B that provides access to cellular wireless services of the MVNO (Carrier B) via a cellular wireless network of the MVNO (carrier B) 304-B is not installed in the wireless device 102, at a fourth step, the device services server 606 obtains an authentication token from a provisioning server 116-B of the MVNO (carrier B). At a fifth step, the device services server 606 provides the authentication token to the secondary eSIM manager 504 of the wireless device 102. The authentication token allows the wireless device 102 to authenticate with the MNVO (Carrier B) and indicate authorization to download and install the secondary eSIM 208-B. At a sixth step, the secondary eSIM manager 504 provides the authentication token to the entitlement stack 506 and triggers the entitlement stack 506 to initiate provisioning of the secondary eSIM 208-B by sending a message, at a seventh step, that includes the authentication token to an entitlement server 510 of the MVNO (Carrier B). When authentication succeeds, the MVNO (Carrier B) entitlement server 510, at an eighth step, sends a message to the provisioning server 116-B of the MVNO (Carrier B), to set up the secondary eSIM 208-B for the wireless device 102. The provisioning server 116-B of the MVNO (Carrier B), at a ninth step, sends a message to an associated SM-DP+ 120-B of the MVNO (Carrier B) to set up the secondary eSIM 208-B for the wireless device 102. At a tenth step, the SM-DP+ 120-B of the MVNO (Carrier B) provides information regarding the secondary eSIM 208-B set up for the wireless device 102 to the provisioning server 116-B of the MVNO (Carrier B), which forwards, at an eleventh step, the secondary eSIM 208-B information to the entitlement server 510 of the MVNO (Carrier B). At a twelfth step, the entitlement server 510 of the MVNO (Carrier B) triggers the secondary eSIM manager 504 of the wireless device 102 to install the secondary eSIM 208-B. In some embodiments, the secondary eSIM 208-B information includes information for obtaining the secondary eSIM 208-B, which can be used by the secondary eSIM manager 504. In some embodiments, the information for obtaining the secondary eSIM 208-B includes a network address for the MVNO (Carrier B) SM-DP+ 120-B, e.g., a URL or FQDN of the SM-DP+ 120-B and/or a unique identifier for the secondary eSIM 208-B, such as an ICCID value for the eSIM 208-B or a hashed version of the ICCID value for the eSIM 208-B. At a fourteenth step, the MVNO (Carrier B) SM-DP+ 120-B sends a message to the device services server 606 the indicting availability of a pending secondary eSIM 208-B for the wireless device 102. At a fifteenth step, the device services server 606 sends a message to a notification server 608 of the manufacturer of the wireless device 102 to trigger a push notification to be sent to a notification receiver 610 the wireless device 102, at a sixteenth step, the push notification indicating the availability of the pending secondary eSIM 208-B for the wireless device 102. At a seventeenth step, the notification receiver 610 of the wireless device 102 forwards the push notification message indicating availability of the pending secondary eSIM 208-B to the secondary eSIM manager 504. In some embodiments, the push notification message includes a network address for the MVNO (Carrier B) SM-DP+ 120-B, e.g., a URL or FQDN of the SM-DP+ 120-B and/or a unique identifier for the secondary eSIM 208-B, such as an ICCID value for the eSIM 208-B or a hashed version of the ICCID value for the eSIM 208-B. In some embodiments, the secondary eSIM manager 504 determines whether silent installation of the secondary eSIM 208-B is supported, e.g., that user consent to install the secondary eSIM 208-B on the eUICC 108 of the wireless device 102 is not required. When silent installation is not supported, the wireless device 102 may optionally obtain user consent for installation of the secondary eSIM 208-B.) At an eighteenth step, the wireless device 102 communicates with the MVNO (Carrier B) SM-DP+ 120-B to download and install the secondary eSIM 208-B to the eUICC 108 of the wireless device 102. At a nineteenth step, the MVNO (Carrier B) SM-DP+ 120-B provides an update to the provisioning server 116-B of the MVNO (Carrier B) regarding the provisioning of the secondary eSIM 208-B to the wireless device 102. At a twentieth step, the secondary eSIM manager 504 causes the wireless device 102 to attach to the cellular wireless network of the MVNO (Carrier B) 304-B, when available, using credentials of the secondary eSIM 208-B. At a twenty-first step, the secondary eSIM manager 504 sends a message to the provisioning server 116-B of the MVNO (Carrier B) indicating successful attachment of the wireless device 102 to the cellular wireless network of the MVNO (Carrier B) 304-B, which can indicate to the provisioning server 116-B of the MVNO (Carrier B) that the secondary eSIM 208-B has been successfully installed and activated on the eUICC 108 of the wireless device 102.

Figure 8:
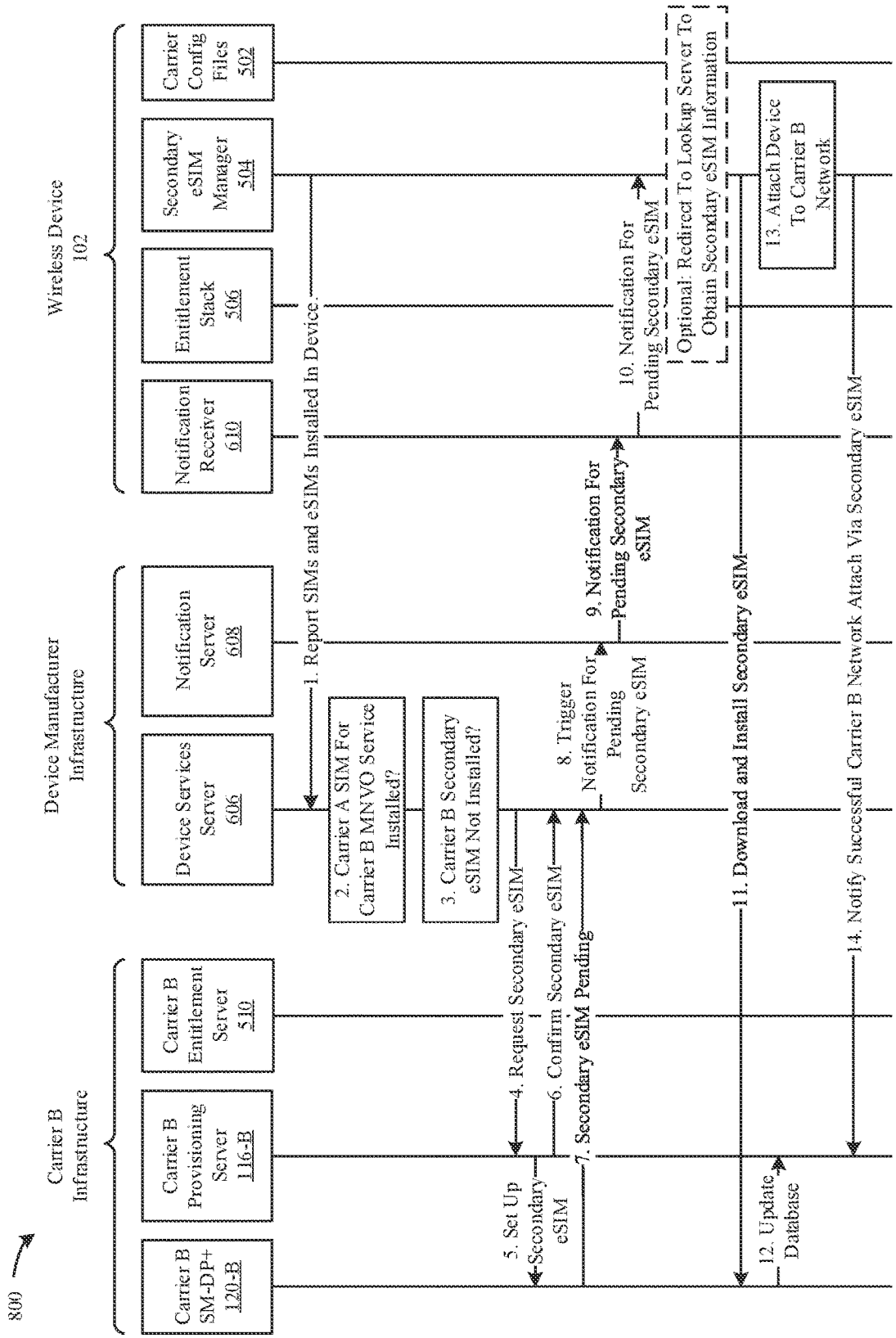
FIG. 8 illustrates a diagram of an additional example of provisioning and installation of a secondary eSIM for access to an MVNO cellular wireless network to a wireless device anchored by a manufacturer device services server, according to some embodiments.

FIG. 8 illustrates a diagram 800 of an additional example of provisioning and installation of a secondary eSIM 208-B for access to an MVNO (Carrier B) cellular wireless network 304-B to a wireless device 102 anchored by a device services server 606 maintained by a manufacturer of the wireless device 102. At a first step, a secondary eSIM manager 504 of the wireless device 102 sends a message to the device services server 606 indicating one or more SIMs 118 and/or eSIMs 208 installed in the wireless device 102. In some embodiments, the wireless device 102 indicates all SIMs 118 and eSIMs 208 installed in the wireless device 102 to the device services server 606. In some embodiments, the wireless device 102 indicates whether a primary SIM 118-A (or equivalent primary eSIM 208-A) that provides access to cellular wireless services of the MVNO (Carrier B) via the cellular wireless network of an MNO 114 (Carrier A) 304-A is installed in the wireless device 102. In some embodiments, the wireless device 102 additionally indicates whether a secondary eSIM 208-B that provides access to cellular wireless services of the MVNO (Carrier B) via a cellular wireless network of the MVNO (carrier B) 304-B is installed in the wireless device 102. At a second step, the device services server 606 determines whether a primary SIM 118-A (or equivalent primary eSIM 208-A) that provides access to cellular wireless services of the MVNO (Carrier B) via the cellular wireless network of an MNO 114 (Carrier A) 304-A is installed in the wireless device 102. At a third step, the device services server 606 determines whether a secondary eSIM 208-B that provides access to cellular wireless services of the MVNO (Carrier B) via a cellular wireless network of the MVNO (carrier B) 304-B is installed in the wireless device 102. When i) a primary SIM 118-A (or equivalent primary eSIM 208-A) that provides access to cellular wireless services of the MVNO (Carrier B) via the cellular wireless network of an MNO 114 (Carrier A) 304-A is installed in the wireless device 102 and ii) a secondary eSIM 208-B that provides access to cellular wireless services of the MVNO (Carrier B) via a cellular wireless network of the MVNO (carrier B) 304-B is not installed in the wireless device 102, at a fourth step, the device services server 606 sends a message to an MVNO (Carrier B) provisioning server 116-B requesting the secondary eSIM 208-B. The provisioning server 116-B of the MVNO (Carrier B), at a fifth step, sends a message to an associated SM-DP+ 120-B of the MVNO (Carrier B) to set up the secondary eSIM 208-B for the wireless device 102, and at a sixth step, the MVNO (Carrier B) provisioning server 116-B sends a message to the device services server 606 of the device manufacturer, the message confirming the request to set up the secondary eSIM 208-B. At a seventh step, the MVNO (Carrier B) SM-DP+ 120-B sends a message to a device services server 606 maintained by a manufacturer of the wireless device 102, the message indicting availability of a pending secondary eSIM 208-B for the wireless device 102. At an eighth step, the device services server 606 sends a message to a notification server 608 of the manufacturer of the wireless device 102 to trigger the notification server 608 to send a push notification to a notification receiver 610 of the wireless device 102, at a ninth step, the push notification indicating the availability of the pending secondary eSIM 208-B for the wireless device 102. At a tenth step, the notification receiver 610 of the wireless device 102 forwards the push notification message indicating availability of the pending secondary eSIM 208-B to a secondary eSIM manager 504. In some embodiments, the push notification message includes eSIM information, such as a network address for the MVNO (Carrier B) SM-DP+ 120-B, e.g., a URL or FQDN of the SM-DP+ 120-B and/or a unique identifier for the pending secondary eSIM 208-B, e.g., an ICCID value or a hashed version of the ICCID value. In some embodiments, the notification redirects the secondary eSIM manager 504 of the wireless device 102 to a lookup server maintained by the manufacturer of the wireless device 102, which can be the device services server 606 in some cases, to obtain secondary eSIM information, such as the identifier for the pending secondary eSIM 208-B, e.g., an ICCID value or a hashed version of the ICCID value, and/or the network address for the MVNO (Carrier B) SM-DP+ 120-B, e.g., a URL or FQDN of the SM-DP+ 120-B. In some embodiments, the secondary eSIM manager 504 determines whether silent installation of the secondary eSIM 208-B is supported, e.g., that user consent to install the secondary eSIM 208-B on the eUICC 108 of the wireless device 102 is not required. When silent installation is not supported, the wireless device 102 may optionally obtain user consent for installation of the secondary eSIM 208-B.) At an eleventh step, the wireless device 102 communicates with the MVNO (Carrier B) SM-DP+ 120-B to download and install the secondary eSIM 208-B to the eUICC 108 of the wireless device 102. At a twelfth step, the MVNO (Carrier B) SM-DP+ 120-B provides an update to the provisioning server 116-B of the MVNO (Carrier B) regarding the provisioning of the secondary eSIM 208-B to the wireless device 102. At a thirteenth step, the secondary eSIM manager 504 causes the wireless device 102 to attach to the cellular wireless network of the MVNO (Carrier B) 304-B, when available, using credentials of the secondary eSIM 208-B. At a fourteenth step, the secondary eSIM manager 504 sends a message to the provisioning server 116-B of the MVNO (Carrier B) indicating successful attachment of the wireless device 102 to the cellular wireless network of the MVNO (Carrier B) 304-B, which can indicate to the provisioning server 116-B of the MVNO (Carrier B) that the secondary eSIM 208-B has been successfully installed and activated on the eUICC 108 of the wireless device 102.

Figure 9:
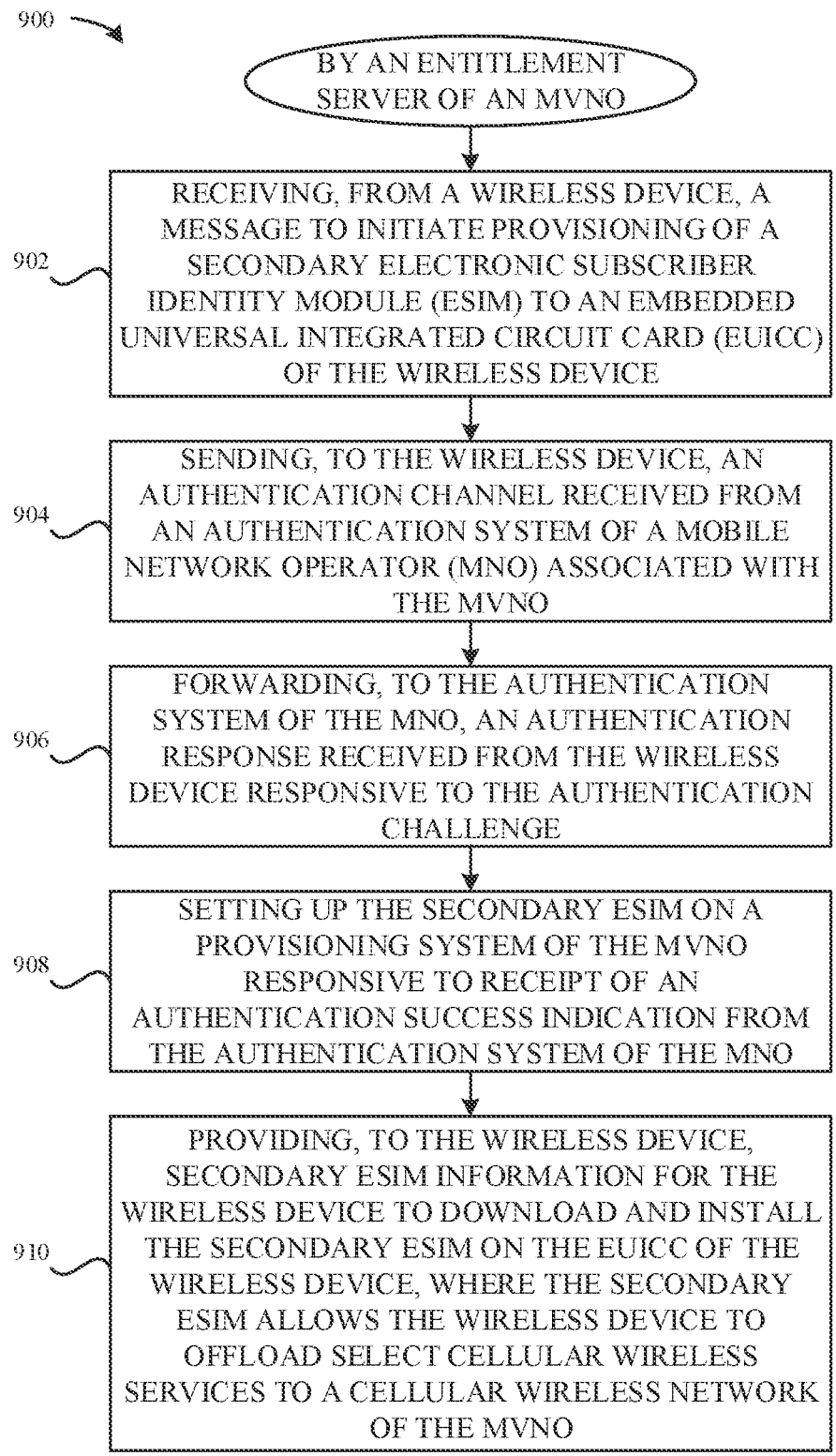
FIG. 9 illustrates a flowchart of an exemplary method performed by an entitlement server of an MVNO to provision to a wireless device a secondary eSIM for offloading select cellular services of an MVNO from a cellular wireless network of the MNO to a cellular wireless network of the MVNO, according to some embodiments.

FIG. 9 illustrates a flowchart 900 of an exemplary method performed by an entitlement server 510 of an MVNO (Carrier B) to provision to a wireless device 102 a secondary eSIM 208-B for offloading select cellular services of the MVNO (Carrier B) from a cellular wireless network 304-A of an MNO (Carrier A) to a cellular wireless network 304-B of the MVNO (Carrier B). At 902, the MVNO (Carrier B) entitlement server 510 receives, from the wireless device 102, a message to initiate provisioning of the secondary eSIM 208-B. At 904, the MVNO (Carrier B) entitlement server 510 sends, to the wireless device 102, an authentication challenge received from an authentication system 516 of the MNO (Carrier A), which is associated with the MVNO (Carrier B). At 906, the MVNO (Carrier B) entitlement server 510 forwards, to the MNO (Carrier A) authentication system 516, an authentication response received from the wireless device 102 responsive to the authentication challenge. At 908, the MVNO (Carrier B) entitlement server 510 sets up the secondary eSIM 208-B on a provisioning system of the MVNO responsive to receipt of an authentication success indication from the MNO (Carrier A) authentication system 516. In some embodiments, the provisioning system of the MVNO (Carrier B) includes an MVNO (Carrier B) provisioning server 116-B and/or an MVNO (Carrier B) SM-DP+ 120-B. At 910, the MVNO (Carrier B) entitlement server 510 provides, to the wireless device, secondary eSIM information for the wireless device to download and install the secondary eSIM on the eUICC of the wireless device, where the secondary eSIM 208-B allows the wireless device 102 to offload select cellular wireless services to the MNO (Carrier A) cellular wireless network 304-A.

In some embodiments, the authentication response is generated by the wireless device 102 using a primary subscriber identity module (SIM) 118-A (or an equivalent primary eSIM 208-A) that allows the wireless device 102 to access cellular wireless services of the MVNO (Carrier B) via a cellular wireless network 304-A of the MNO (Carrier A). In some embodiments, the wireless device 102 sends the message (and the entitlement server 510 of the MVNO (Carrier B) receives the message) to initiate provisioning of the secondary eSIM 208-B responsive to the wireless device 102 determining: i) the primary SIM 118-A (or equivalent primary eSIM 208-A) for access to cellular wireless services of the MVNO (Carrier B) via the MNO cellular wireless network 304-A is installed in the wireless device 102, ii) the secondary eSIM 208-B is not installed in the wireless device 102, and iii) a carrier configuration file for the MVNO (Carrier B) in the wireless device 102 indicates provisioning of the secondary eSIM 208-B is supported. In some embodiments, the primary SIM 118-A (or equivalent primary eSIM 208-A) and the secondary eSIM 208-B share a common mobile station international subscriber directory number (MSISDN) value. In some embodiments, the message to initiate provisioning of the secondary eSIM 208-B includes an indication of one or more SIMs 118 or eSIMs 208 installed in the wireless device 102. In some embodiments, the secondary eSIM 208-B information includes a unique identifier for the secondary eSIM 208-B and a network address for a network entity from which to download the secondary eSIM 208-B. In some embodiments, the unique identifier for the secondary eSIM 208-B includes an integrated circuit card identifier (ICCID) value or a hashed version of the ICCID value, and the network address includes a universal resource locator (URL) or fully qualified domain name (FQDN) for a subscription manager-data preparation plus (SM-DP+) 120-B of the MVNO (Carrier B). In some embodiments, the select cellular wireless services includes packet data traffic. In some embodiments, the secondary eSIM 208-B is downloaded to and installed on the eUICC 108 of the wireless device 102 without obtaining consent from a user of the wireless device 102.

Figure 10:
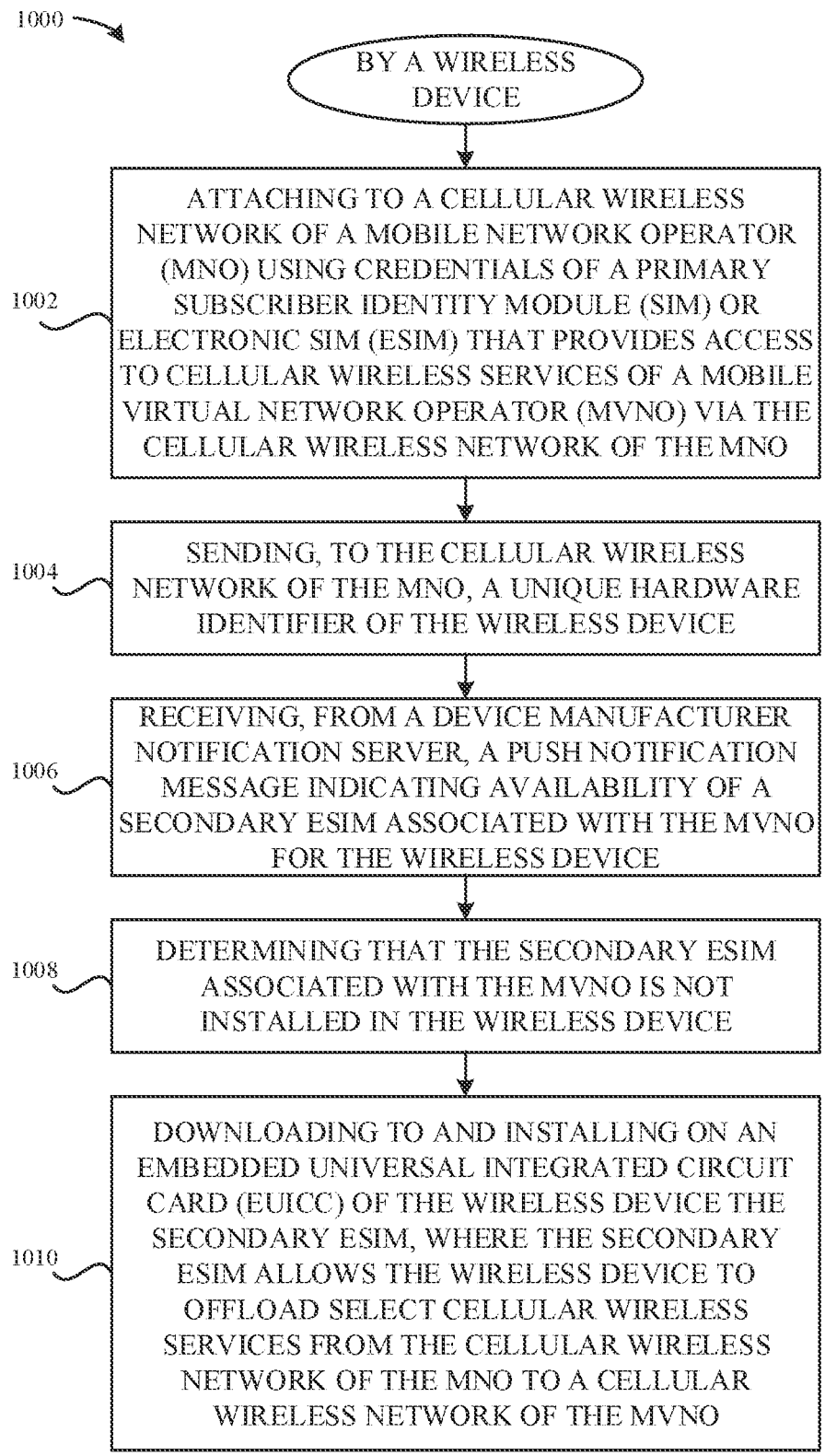
FIG. 10 illustrates a flowchart of an exemplary method performed by a wireless device to provision and install a secondary eSIM for offloading select cellular services of an MVNO from a cellular wireless network of the MNO to a cellular wireless network of the MVNO, according to some embodiments.

FIG. 10 illustrates a flowchart 1000 of an exemplary method performed by a wireless device 102 to provision and install a secondary eSIM 208-B for offloading select cellular services of an MVNO (Carrier B) from a cellular wireless network 304-A of the MNO (Carrier A) to a cellular wireless network 304-B of the MVNO (Carrier B). At 1002, the wireless device 102 attaches to the MNO cellular wireless network 304-A using credentials of a primary SIM 118-A (or an equivalent eSIM 208-A) that provides access to cellular wireless services of the MVNO (Carrier B) via the MNO (Carrier A) cellular wireless network 304-A. At 1004, the wireless device 102 sends, to the MNO (Carrier A) cellular wireless network 304-A, a unique hardware identifier of the wireless device 102. At 1006, the wireless device 102 receives, from a device manufacturer notification server 608, a push notification message indicating availability of a secondary eSIM 208-B associated with the MVNO (Carrier B) for the wireless device 102. At 1006, the wireless device 102 determines that the secondary eSIM 208-B associated with the MVNO (Carrier B) is not installed in the wireless device 102. At 1008, the wireless device 102 downloads to and installs on an eUICC 108 of the wireless device 102 the secondary eSIM 208-B, where the secondary eSIM 208-B allows the wireless device 102 to offload select cellular wireless services from the MNO (Carrier A) cellular wireless network 304-A to a cellular wireless network 304-B of the MVNO (Carrier B).

In some embodiments, the unique hardware identifier of the wireless device 102 includes an international mobile equipment identifier (IMEI) value of the wireless device 102. In some embodiments, the MNO (Carrier A) cellular wireless network 304-A reports the IMEI value to a provisioning system of the MVNO (Carrier B), and the provisioning system of the MVNO determines whether the secondary eSIM 208-B is installed on the eUICC 108 of the wireless device 102. In some embodiments, the provisioning system of the MVNO (Carrier B) includes an MVNO (Carrier B) provisioning server 116-B and/or an MVNO (Carrier B) SM-DP+ 120-B. In some embodiments, the provisioning system of the MVNO: i) maintains a record of eSIMs 208 installed on the eUICC 108 based on an eUICC identifier (EID) value of the eUICC 108, ii) obtains the EID value of the eUICC 108 from a device manufacturer query server 604 using the IMEI value of the wireless device 102, and iii) determines whether the secondary eSIM 208-B is installed on the eUICC 108 of the wireless device 102 based on the record of eSIMs 208. In some embodiments, the push notification message includes a unique identifier for the secondary eSIM 208-B, e.g., an ICCID value or a hashed version of the ICCID value, and a network address for a network entity from which to download the secondary eSIM 208-B, e.g., a URL or FQDN for the SM-DP+ 120-B of the MVNO (Carrier B).

Figure 11:
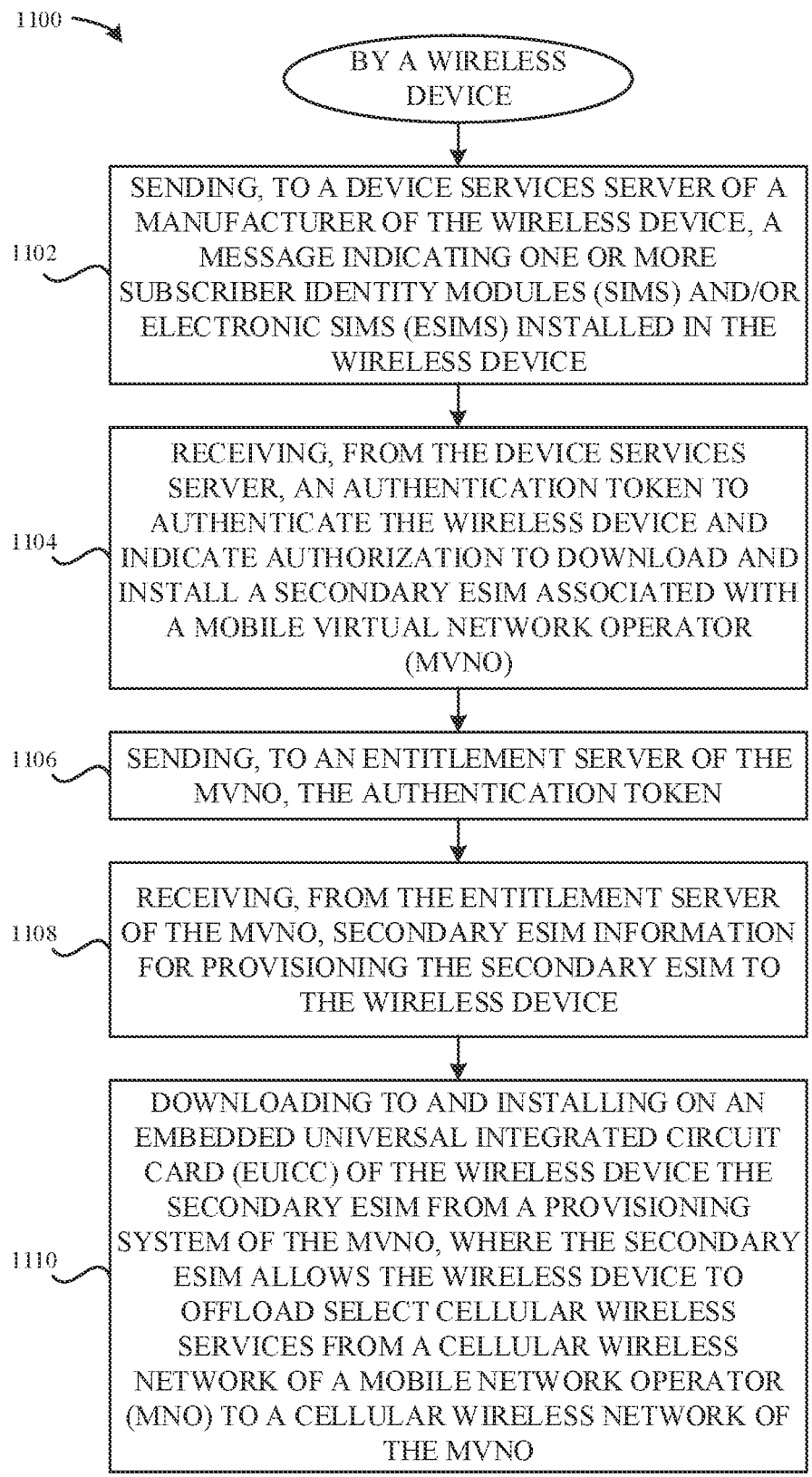
FIG. 11 illustrates a flowchart of another exemplary method performed by a wireless device to provision and install a secondary eSIM for offloading select cellular services of an MVNO from a cellular wireless network of the MNO to a cellular wireless network of the MVNO, according to some embodiments.

FIG. 11 illustrates a flowchart 1100 of another exemplary method performed by a wireless device 102 to provision and install a secondary eSIM 208-B for offloading select cellular services of an MVNO (Carrier B) from a cellular wireless network 304-A of an MNO (Carrier A) to a cellular wireless network 304-B of the MVNO (Carrier B). At 1102, the wireless device 102 sends, to a device services server 606 of a manufacturer of the wireless device 102, a message indicating one or more SIMs 118 and/or eSIMs 208 installed in the wireless device 102. At 1104, the wireless device 102 receives from the device services server 606, an authentication token to authenticate the wireless device 102 and indicate authorization to download and install a secondary eSIM 208-B associated with a MVNO (Carrier B). At 1106, the wireless device 102 sends, to an entitlement server 510 of the MVNO (Carrier B), the authentication token. At 1108, the wireless device 102 receives, from the entitlement server 510 of the MVNO (Carrier B), secondary eSIM 208-B information for provisioning the secondary eSIM 208-B to the wireless device 102. At 1110, the wireless device 102 downloads to and install on an eUICC 108 of the wireless device 102 the secondary eSIM 208 from a provisioning system of the MVNO, where the secondary eSIM 208-B allows the wireless device 102 to offload select cellular wireless services from the MNO (Carrier A) cellular wireless network 304-A to the MVNO (Carrier B) cellular wireless network 304-B.

In some embodiments, the wireless device 102 includes a primary SIM 118-A (or an equivalent primary eSIM 208-A) that provides access to cellular wireless services of the MVNO via the MNO (Carrier A) cellular wireless network 304-A. In some embodiments, the primary SIM 118-A (or the equivalent primary eSIM 208-A) and the secondary eSIM 208-B share a common mobile station international subscriber directory number (MSISDN) value. In some embodiments, the wireless device 102 is further configured to: i) attach to the MVNO (Carrier B) cellular wireless network 304-B using the secondary eSIM 208-B, and ii) send, to the provisioning system of the MVNO (Carrier B), a message indicating successful attachment of the wireless device 102 to the MVNO (Carrier B) cellular wireless network 304-B using the secondary eSIM 208-B. In some embodiments, the secondary eSIM 208-B information includes a unique identifier for the secondary eSIM 208-B and a network address for the provisioning system of the MVNO from which to download the secondary eSIM 208-B. In some embodiments, the provisioning system of the MVNO (Carrier B) includes an MVNO (Carrier B) provisioning server 116-B and/or an MVNO (Carrier B) SM-DP+ 120-B. In some embodiments, the devices services server 606 determines a requirement for provisioning the secondary eSIM 208-B to the wireless device 102 based on the message indicating the one or more SIMs 118 and/or eSIMs 208 included in the wireless device 102, and the message indicates: i) the wireless device 102 includes a primary SIM 118-A (or an equivalent primary eSIM 208-A) for access to cellular wireless services of the MVNO (Carrier B) via the MNO (Carrier A) cellular wireless network 304-A; and ii) the wireless device 102 does not include the secondary eSIM 208-B for access to the MVNO (Carrier B) cellular wireless network 304-B.

Figure 12:
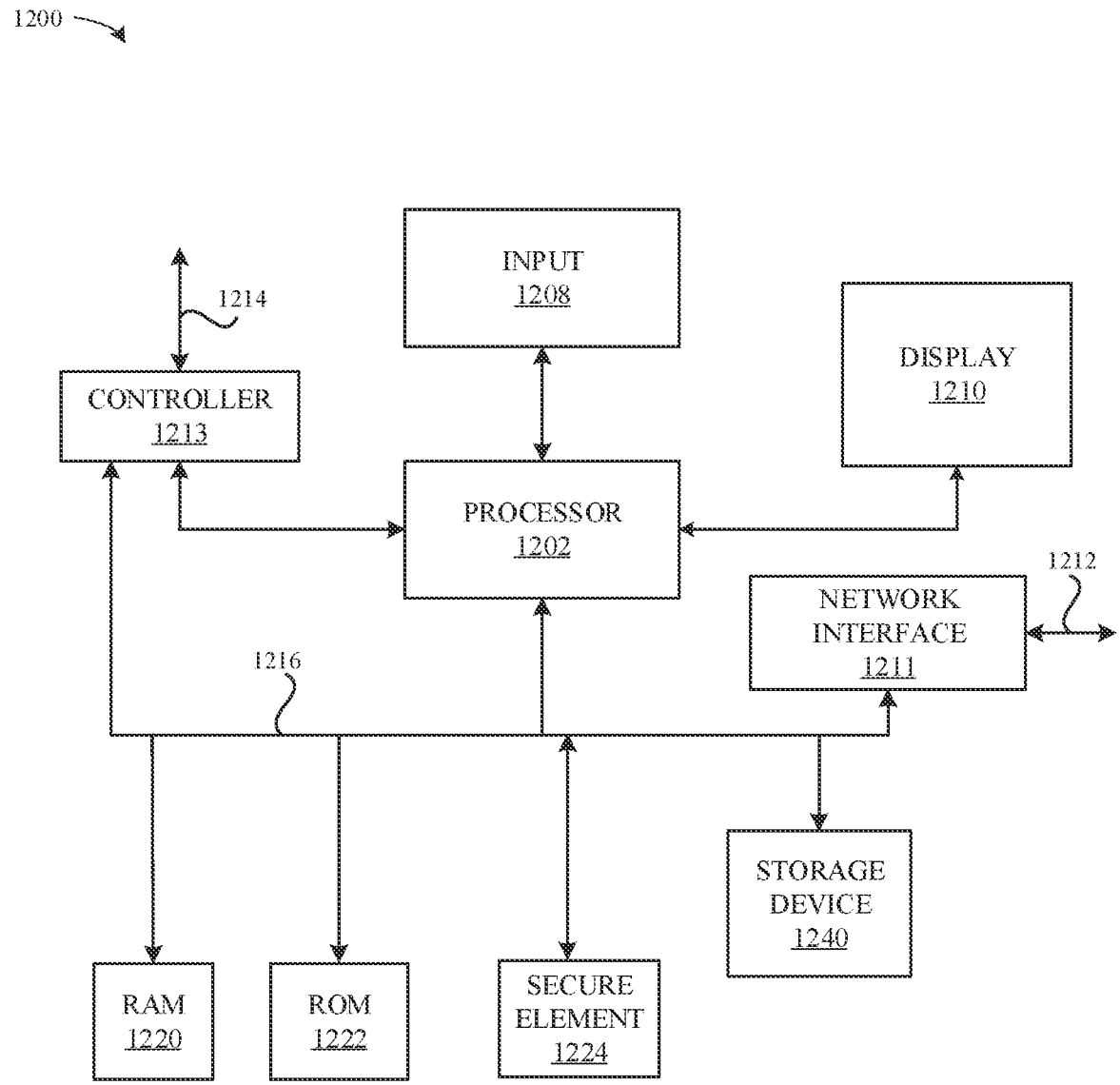
FIG. 12 illustrates a block diagram of exemplary elements of a mobile wireless device, according to some embodiments.

FIG. 12 illustrates a detailed view of a representative computing device 1200 that can be used to implement various methods described herein, according to some embodiments. In particular, the detailed view illustrates various components that can be included in a wireless device 102. As shown in FIG. 12, the computing device 1200 can include a processor 1202 that represents a microprocessor or controller for controlling the overall operation of computing device 1200. The computing device 1200 can also include a user input device 1208 that allows a user of the computing device 1200 to interact with the computing device 1200. For example, the user input device 1208 can take a variety of forms, such as a button, keypad, dial, touch screen, audio input interface, visual/image capture input interface, input in the form of sensor data, etc. Still further, the computing device 1200 can include a display 1210 that can be controlled by the processor 1202 to display information to the user. A data bus 1216 can facilitate data transfer between at least a storage device 1240, the processor 1202, and a controller 1213. The controller 1213 can be used to interface with and control different equipment through an equipment control bus 1214. The computing device 1200 can also include a network/bus interface 1211 that communicatively couples to a data link 1212. In the case of a wireless connection, the network/bus interface 1211 can include a wireless transceiver.

The computing device 1200 also includes a storage device 1240, which can comprise a single disk or a plurality of disks (e.g., hard drives), and includes a storage management module that manages one or more partitions within the storage device 1240. In some embodiments, storage device 1240 can include flash memory, semiconductor (solid state) memory or the like. The computing device 1200 can also include a Random Access Memory (RAM) 1220 and a Read-Only Memory (ROM) 1222. The ROM 1222 can store programs, utilities or processes to be executed in a non-volatile manner. The RAM 1220 can provide volatile data storage, and stores instructions related to the operation of the computing device 1200. The computing device 1200 can further include a secure element (SE) 1224, such as an eUICC 108, a UICC 118, or another secure storage for cellular wireless system access by a wireless device 102.

Wireless Terminology

In accordance with various embodiments described herein, the terms "wireless communication device," "wireless device," "mobile wireless device," "mobile station," and "user equipment" (UE) may be used interchangeably herein to describe one or more common consumer electronic devices that may be capable of performing procedures associated with various embodiments of the disclosure. In accordance with various implementations, any one of these consumer electronic devices may relate to: a cellular phone or a smart phone, a tablet computer, a laptop computer, a notebook computer, a personal computer, a netbook computer, a media player device, an electronic book device, a MiFi® device, a wearable computing device, as well as any other type of electronic computing device having wireless communication capability that can include communication via one or more wireless communication protocols such as used for communication on: a wireless wide area network (WWAN), a wireless metro area network (WMAN) a wireless local area network (WLAN), a wireless personal area network (WPAN), a near field communication (NFC), a cellular wireless network, a fourth generation (4G) Long Term Evolution (LTE), LTE Advanced (LTE-A), and/or 5G or other present or future developed advanced cellular wireless networks.

The wireless communication device, in some embodiments, can also operate as part of a wireless communication system, which can include a set of client devices, which can also be referred to as stations, client wireless devices, or client wireless communication devices, interconnected to an access point (AP), e.g., as part of a WLAN, and/or to each other, e.g., as part of a WPAN and/or an "ad hoc" wireless network. In some embodiments, the client device can be any wireless communication device that is capable of communicating via a WLAN technology, e.g., in accordance with a wireless local area network communication protocol. In some embodiments, the WLAN technology can include a Wi-Fi (or more generically a WLAN) wireless communication subsystem or radio, the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; or other present or future developed IEEE 802.11 technologies.

Additionally, it should be understood that the UEs described herein may be configured as multi-mode wireless communication devices that are also capable of communicating via different third generation (3G) and/or second generation (2G) RATs. In these scenarios, a multi-mode UE can be configured to prefer attachment to LTE networks offering faster data rate throughput, as compared to other 3G legacy networks offering lower data rate throughputs. For instance, in some implementations, a multi-mode UE may be configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a non-transitory computer readable medium. The non-transitory computer readable medium is any data storage device that can store data which can thereafter be read by a computer system. Examples of the non-transitory computer readable medium include read-only memory, random-access memory, CD-ROMs, HDDs, DVDs, magnetic tape, and optical data storage devices. The non-transitory computer readable medium can also be distributed over network-coupled computer systems so that the computer readable code is stored and executed in a distributed fashion.

Regarding the present disclosure, it is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. An apparatus configured for operation in a wireless device, the apparatus comprising one or more processors communicatively coupled to wireless circuitry and to a memory storing instructions that, when executed by the one or more processors, configure the wireless device to:

send, to a device services server of a manufacturer of the wireless device, a message indicating one or more subscriber identity modules (SIMs) and/or electronic SIMs (eSIMs) installed in the wireless device;

receive, from the device services server, an authentication token to authenticate the wireless device and indicate authorization to download and install a secondary eSIM associated with a mobile virtual network operator (MVNO);

send, to an entitlement server of the MVNO, the authentication token;

receive, from the entitlement server of the MVNO, secondary eSIM information for provisioning the secondary eSIM to the wireless device; and download to and install on an embedded universal integrated circuit card (eUICC) of the wireless device the secondary eSIM from a provisioning system of the MVNO, wherein:

the secondary eSIM allows the wireless device to offload select cellular wireless services from a cellular wireless network of a mobile network operator (MNO) to a cellular wireless network of the MVNO.

2. The apparatus of claim 1, wherein the wireless device includes a primary SIM or eSIM that provides access to cellular wireless services of the MVNO via the cellular wireless network of the MNO.

3. The apparatus of claim 2, wherein the primary SIM or eSIM and the secondary eSIM share a common mobile station international subscriber directory number (MSISDN) value.

4. The apparatus of claim 1, wherein the wireless device is further configured to:

attach to the cellular wireless network of the MVNO using the secondary eSIM; and send, to the provisioning system of the MVNO, a message indicating successful attachment of the wireless device to the cellular wireless network of the MVNO using the secondary eSIM.

5. The apparatus of claim 1, wherein the secondary eSIM information includes a unique identifier for the secondary eSIM and a network address for the provisioning system of the MVNO from which to download the secondary eSIM.

6. The apparatus of claim 1, wherein:

the device services server determines a requirement for provisioning the secondary eSIM to the wireless device based on the message indicating the one or more SIMs and/or eSIMs included in the wireless device; and the message indicates:

the wireless device includes a primary SIM or eSIM for access to cellular wireless services of the MVNO via the cellular wireless network of the MNO; and the wireless device does not include the secondary eSIM for access to the cellular wireless network of the MVNO.

7. The apparatus of claim 1, wherein a carrier configuration file for the MVNO in the wireless device indicates provisioning of the secondary eSIM is supported.

8. A method for provisioning a secondary electronic subscriber identity module (eSIM) to an embedded universal integrated circuit card (eUICC) of a wireless device, the method comprising:

sending, to a device services server of a manufacturer of the wireless device, a message indicating one or more subscriber identity modules (SIMs) and/or eSIMs installed in the wireless device;

receiving, from the device services server, an authentication token to authenticate the wireless device and indicate authorization to download and install a secondary eSIM associated with a mobile virtual network operator (MVNO);

sending, to an entitlement server of the MVNO, the authentication token;

receiving, from the entitlement server of the MVNO, secondary eSIM information for provisioning the secondary eSIM to the wireless device; and downloading to and installing on an embedded universal integrated circuit card (eUICC) of the wireless device the secondary eSIM from a provisioning system of the MVNO, wherein:

the secondary eSIM allows the wireless device to offload select cellular wireless services from a cellular wireless network of a mobile network operator (MNO) to a cellular wireless network of the MVNO.

9. The method of claim 8, wherein the wireless device includes a primary SIM or eSIM that provides access to cellular wireless services of the MVNO via the cellular wireless network of the MNO.

10. The method of claim 9, wherein the primary SIM or eSIM and the secondary eSIM share a common mobile station international subscriber directory number (MSISDN) value.

11. The method of claim 8, further comprising:

attaching to the cellular wireless network of the MVNO using the secondary eSIM; and sending, to the provisioning system of the MVNO, a message indicating successful attachment of the wireless device to the cellular wireless network of the MVNO using the secondary eSIM.

12. The method of claim 8, wherein the secondary eSIM information includes a unique identifier for the secondary eSIM and a network address for the provisioning system of the MVNO from which to download the secondary eSIM.

13. The method of claim 8, wherein:

the device services server determines a requirement for provisioning the secondary eSIM to the wireless device based on the message indicating the one or more SIMs and/or eSIMs included in the wireless device; and the message indicates:

the wireless device includes a primary SIM or eSIM for access to cellular wireless services of the MVNO via the cellular wireless network of the MNO; and the wireless device does not include the secondary eSIM for access to the cellular wireless network of the MVNO.

14. The method of claim 8, wherein a carrier configuration file for the MVNO in the wireless device indicates provisioning of the secondary eSIM is supported.

15. A wireless device comprising:

wireless circuitry comprising one or more antennas; and one or more processors communicatively coupled to the wireless circuitry and to a memory storing instructions that, when executed by the one or more processors, configure the wireless device to:

send, to a device services server of a manufacturer of the wireless device, a message indicating one or more subscriber identity modules (SIMs) and/or electronic SIMs (eSIMs) installed in the wireless device;

receive, from the device services server, an authentication token to authenticate the wireless device and indicate authorization to download and install a secondary eSIM associated with a mobile virtual network operator (MVNO);

send, to an entitlement server of the MVNO, the authentication token;
receive, from the entitlement server of the MVNO, secondary eSIM information for provisioning the secondary eSIM to the wireless device; and
download to and install on an embedded universal integrated circuit card (eUICC) of the wireless device the secondary eSIM from a provisioning system of the MVNO,
wherein:
the secondary eSIM allows the wireless device to offload select cellular wireless services from a cellular wireless network of a mobile network operator (MNO) to a cellular wireless network of the MVNO.

16. The wireless device of claim 15, wherein the wireless device includes a primary SIM or eSIM that provides access to cellular wireless services of the MVNO via the cellular wireless network of the MNO.

17. The wireless device of claim 16, wherein the primary SIM or eSIM and the secondary eSIM share a common mobile station international subscriber directory number (MSISDN) value.

18. The wireless device of claim 15, wherein the wireless device is further configured to:
attach to the cellular wireless network of the MVNO using the secondary eSIM; and
send, to the provisioning system of the MVNO, a message indicating successful attachment of the wireless device to the cellular wireless network of the MVNO using the secondary eSIM.

19. The wireless device of claim 15, wherein the secondary eSIM information includes a unique identifier for the secondary eSIM and a network address for the provisioning system of the MVNO from which to download the secondary eSIM.

20. The wireless device of claim 15, wherein:
the device services server determines a requirement for provisioning the secondary eSIM to the wireless device based on the message indicating the one or more SIMs and/or eSIMs included in the wireless device; and
the message indicates:
the wireless device includes a primary SIM or eSIM for access to cellular wireless services of the MVNO via the cellular wireless network of the MNO; and
the wireless device does not include the secondary eSIM for access to the cellular wireless network of the MVNO.

* * * * *